United States Patent
Lee

(10) Patent No.: US 12,041,432 B2
(45) Date of Patent: Jul. 16, 2024

(54) METHOD, DEVICE, AND COMPUTER PROGRAM FOR CONTROLLING AND MANAGING STATE OF PERIPHERAL DEVICE IN WIRELESS COMMUNICATION SYSTEM, AND RECORDING MEDIUM THEREFOR

(71) Applicant: INTELLECTUAL DISCOVERY CO., LTD., Seoul (KR)

(72) Inventor: Jea Ho Lee, Cheongju-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 233 days.

(21) Appl. No.: 17/621,101

(22) PCT Filed: Jun. 23, 2020

(86) PCT No.: PCT/KR2020/008150
§ 371 (c)(1),
(2) Date: Dec. 20, 2021

(87) PCT Pub. No.: WO2020/262926
PCT Pub. Date: Dec. 30, 2020

(65) Prior Publication Data
US 2022/0353616 A1 Nov. 3, 2022

(30) Foreign Application Priority Data
Jun. 24, 2019 (KR) .................. 10-2019-0075280

(51) Int. Cl.
*H04R 5/04* (2006.01)
*H04W 4/80* (2018.01)

(52) U.S. Cl.
CPC ............ *H04R 5/04* (2013.01); *H04W 4/80* (2018.02); *H04R 2420/01* (2013.01); *H04R 2420/07* (2013.01)

(58) Field of Classification Search
CPC .. H04R 5/04; H04R 2420/01; H04R 2420/07; H04W 4/80
See application file for complete search history.

(56) References Cited

U.S. PATENT DOCUMENTS

2016/0286337 A1  9/2016 Thekkedathu Sivaraman et al.

FOREIGN PATENT DOCUMENTS

KR   10-2010-0057181 A   5/2010
KR   10-2016-0013894 A   2/2016
(Continued)

OTHER PUBLICATIONS

International Search Report of PCT/KR2020/008150 dated Sep. 17, 2020 [PCT/ISA/210].

*Primary Examiner* — David L Ton
(74) *Attorney, Agent, or Firm* — Sughrue Mion, PLLC

(57) ABSTRACT

The present disclosure relates to a method, a device, and a computer program for controlling and managing a state of a peripheral device in a wireless communication system, and a recording medium therefor. According to an embodiment of the present disclosure, a method for changing an audio stream session-related state may include the steps of: acquiring information relating to a current audio stream session-related state of a second device before a first device in a first audio stream session-related state performs transition of an audio stream session-related state; determining a second audio stream session-related state of the first device at least on the basis of the current audio stream session-related state of the second device; and performing the transition of the audio stream session-related state by the first device on the basis of the second audio stream session-related state.

10 Claims, 32 Drawing Sheets

(56) References Cited

FOREIGN PATENT DOCUMENTS

| KR | 10-2017-0016883 A | 2/2017 |
|---|---|---|
| WO | 2008/033491 A2 | 3/2008 |

(a)

(b)

METHOD, DEVICE, AND COMPUTER PROGRAM FOR CONTROLLING AND MANAGING STATE OF PERIPHERAL DEVICE IN WIRELESS COMMUNICATION SYSTEM, AND RECORDING MEDIUM THEREFOR

CROSS REFERENCE TO RELATED APPLICATIONS

This application is a National Stage of International Application No. PCT/KR2020/008150, filed Jun. 23, 2020, claiming priority to Korean Patent Application No. 10-2019-0075280, filed Jun. 24, 2019.

TECHNICAL FIELD

The present disclosure relates to state of a device in a wireless communication system, and more specifically, to a method, an apparatus, a computer program, and a recording medium thereof for controlling and managing the state of a peripheral device in a wireless communication system.

BACKGROUND

Bluetooth is a short-range wireless communication standard and includes BR (Basic Rate)/EDR (Enhanced Data Rate) technology and LE (Low Energy) technology. BR/EDR is also called Bluetooth classic, and includes BR technology applied from Bluetooth 1.0 and EDR technology applied from Bluetooth 2.0. Bluetooth LE (BLE) applied after Bluetooth 4.0 is a technology that supports transmission and reception of relatively large data with low power consumption.

The Bluetooth standard includes various profiles. For example, the Hands-Free Profile (HFP) defines what is necessary for one device to function as an audio gateway (AG) such as a smartphone and another device to function as a hands-free device such as a headset. In addition, A2DP (Advance Audio Distribution Profile) defines what is necessary for one device to function as an audio source such as a music player and another device to function as an audio sink such as a speaker.

As the spread of wireless devices increases recently, the demand for transmitting and receiving audio data in various topologies of many-to-many or M-to-N connection types is increasing. For example, streaming services that require a 5.1 channel environment are emerging, and it is being discussed to support a 5.1 channel environment using a plurality of Bluetooth portable speakers, breaking away from the limitations of a conventional 5.1 channel dedicated wired speaker. However, since the conventional Bluetooth audio technology was mainly developed in consideration of a use case of a one-to-one connection between two devices, it is not suitable for supporting audio data transmission/reception between multiple devices and delay is a big problem. In addition, as the number of Bluetooth audio devices increases, there is a problem in that power consumption for searching for peripheral devices increases.

In addition, since the current state of another peripheral device is not considered when changing the state of the device, there is a problem in that unnecessary procedures are performed. However, a specific method for acquiring the current state of the another device is not provided.

DISCLOSURE

Technical Problem

A technical problem of the present disclosure is to support control and management of state of a peripheral device in a wireless communication system.

An additional technical problem of the present disclosure is to provide a method and an apparatus for omitting unnecessary procedures based on the current state of a peripheral device in a wireless communication system.

The technical problems to be achieved in the present disclosure are not limited to the technical problems mentioned above, and other technical problems not mentioned will be clearly understood by those of ordinary skill in the art to which the present disclosure belongs from the following description.

Technical Solution

A method for changing an audio stream session-related state according to an aspect of the present disclosure may include: obtaining information on a current audio stream session-related state of a second device before a first device in a first audio stream session-related state performs an audio stream session-related state transition; determining a second audio stream session-related state of the first device based at least on the current audio stream session-related state of the second device; and performing, by the first device, the audio stream session-related state transition based on the second audio stream session-related state.

A device for changing an audio stream session-related state according to an aspect of the present disclosure may include: a transceiver configured to perform signal transmission and reception with another device; and a processor configured to control the transceiver and the device; wherein the processor is configured to: obtain information on a current audio stream session-related state of the another device before the device in a first audio stream session-related state performs an audio stream session-related state transition; determine a second audio stream session-related state of the device based at least on the current audio stream session-related state of the another device; and cause the device to perform the audio stream session-related state transition based on the second audio stream session-related state.

The features briefly summarized above with respect to the present disclosure are merely exemplary aspects of the detailed description of the present disclosure that follows, and do not limit the scope of the present disclosure.

Technical Effects

According to the present disclosure, control and management of state of a peripheral device in a wireless communication system may be supported.

According to the present disclosure, a method and an apparatus for omitting unnecessary procedures based on the current state of a peripheral device in a wireless communication system may be provided.

The technical effects of the present disclosure are not limited to the above-described effects, and other effects not mentioned herein may be understood to those skilled in the art from the following description.

BEST MODE

Figure 1:
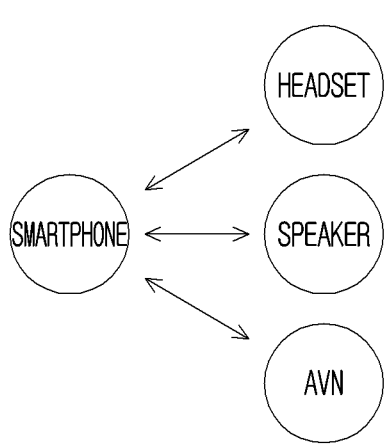
FIG. 1 is a diagram exemplarily illustrating a conventional audio connection type and an audio connection type to which the present disclosure is applicable.
Figure 1:
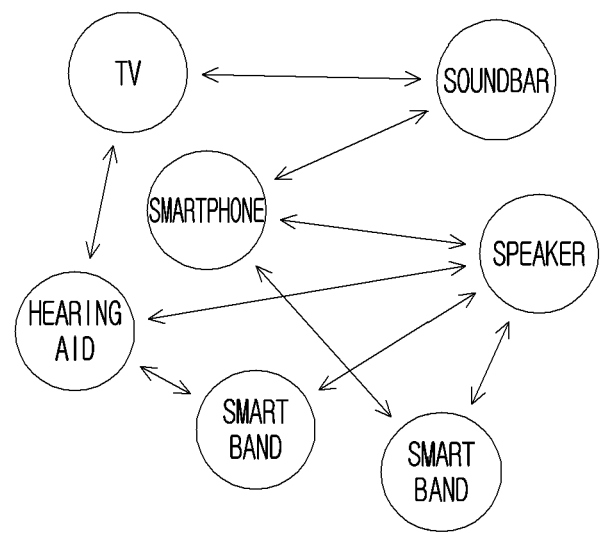

Hereinafter, with reference to the accompanying drawings, embodiment of the present disclosure will be described in detail so that those of ordinary skill in the art to which the present disclosure belongs can easily implement them. However, the present disclosure may be embodied in several different forms and is not limited to the embodiments described herein.

In describing the embodiments of the present disclosure, if it is determined that a detailed description of a well-known configuration or function may obscure the gist of the present disclosure, a detailed description thereof will be omitted. And, in the drawings, parts not related to the description of the present disclosure are omitted, and similar reference numerals are attached to similar parts.

In the present disclosure, when a component is "connected", "coupled" or "accessed" to another component, it may include not only a direct connection relationship, but also an indirect connection relationship in which another component exists in the middle. Also, in the present disclosure, the terms "comprises" or "have" specify the presence of a recited feature, step, operation, element and/or component, but it does not exclude the presence or addition of one or more other features, steps, operations, elements, components and/or groups thereof.

In the present disclosure, terms such as "first" and "second" are used only for the purpose of distinguishing one component from other components and are not used to limit the components. And, unless otherwise noted, the terms do not limit the order or importance between the components. Accordingly, within the scope of the present disclosure, a first component in one embodiment may be referred to as a second component in another embodiment, and similarly, a second component in one embodiment may be referred to as a first component in another embodiment.

In the present disclosure, the components that are distinguished from each other are for clearly describing each characteristic, and do not necessarily mean that the components are separated. That is, a plurality of components may be integrated to form one hardware unit or a software unit, or one component may be distributed to form a plurality of hardware units or software units. Accordingly, even if not specifically mentioned, such integrated or dispersed embodiments are also included in the scope of the present disclosure.

The various embodiments of the present disclosure are not intended to list all possible combinations of components, but rather to illustrate representative aspects of the disclosure, and some or all of the components described in the various embodiments may be applied independently or in combination of two or more. That is, components described in various embodiments of the present disclosure do not necessarily mean essential components, and some may be optional components. Accordingly, an embodiment composed of a subset of components described in one embodiment is also included in the scope of the present disclosure. In addition, embodiments including other components in addition to components described in various embodiments are also included in the scope of the present disclosure.

Example methods of the present disclosure are expressed as a series of operations for clarity of description, but this is not intended to limit the order in which the steps are performed, and if necessary, each step may be performed simultaneously or in a different order. In addition, in order to implement the method according to the present disclosure, other steps may be included in addition to the illustrated steps, steps may be included except for some steps, or additional steps may be included except for some steps.

Terms used in the present disclosure is for the description of specific embodiments and is not intended to limit the claims. As used in the description of the embodiments and in the appended claims, the singular form is intended to include the plural form as well, unless the context clearly dictates otherwise. Also, the term "and/or" used in the present disclosure may refer to one of the related enumerations, or is meant to refer to and include all possible (or random) combinations of two or more thereof.

Definitions of terms used in the present disclosure are as follows.

An audio sink is an entity that receives audio data from an audio source.

An audio source is an entity that transmits audio data to the audio sink.

An audio channel is a single flow of coded or uncoded audio data.

An audio stream is a unidirectional logical communication channel that carries audio data flowing from the audio source to the audio sink. Audio data may flow on an audio stream session (ASS). An audio stream may carry audio data for one or more audio channels.

An audio group may include one or more synchronized audio streams.

A content type indicates a classification of content of an audio group. The classification may include whether the audio was initiated by the user. A content type indicates a classification of content of an audio group. The classification may include whether the audio was initiated by the user.

Examples of the content type may include uncategorized audio (UncategorizedAudio), ringtone (Ringtone), system sound (SystemSound), satellite navigation (Satnav), call audio (CallAudio), media (Media), and the like.

Metadata is a variable-length data that describes and provides the context of audio data. Metadata may be defined for a higher layer.

An audio stream session (ASS) means to a unidirectional or bidirectional transmission/exchange process of an audio stream. An endpoint of an ASS corresponds to an audio input and/or audio output of an audio stream session, and may correspond to one device or a group of devices. The end of the ASS resides on the server and may be configured by the server or by the client. The server may store, change, and manage ASS state.

QoS (Quality of Service) means a quality of service for an audio stream and may correspond to a requirement for a specific service.

An audio location means a logical spatial rendering location intended for an audio channel within a spatial arrangement of a device for rendering audio. For example, the left and right location of a headset may correspond to an audio location. An audio location may be allocated to an audio channel.

CBIS (Connection Based Isochronous Stream) is a term defined in a core layer and is a concept corresponding to an audio stream in an ASS service. A unidirectional CBIS may have one audio stream, and a bidirectional CBIS may have two audio streams.

CBISS (Connection Based Isochronous Stream Set) is a term defined in a core layer and is a concept corresponding to an audio group in the ASS service.

An audio scene application (ASA) means an audio group performing a specific content type.

ASC (Audio Steam Capability) is a set of parameters necessary for configuring an audio session capability.

An audio advertisement is to discover the availability of ASA participation. An audio general advertisement is an audio advertisement that does not specify a target, and an audio directed advertisement is an audio advertisement for a specific target.

Isochronous data means data that is limited by time. For example, isochronous data may be time-dependent audio, such as television audio that needs to be synchronized with respect to an image of a video, or audio that needs to be synchronized and reproduced in multiple devices constituting a multi-channel.

An isochronous channel means a logical transmitting end used to transmit isochronous data from a transmitting device to one or more receiving devices.

An isochronous stream means a logical link carrying one or more isochronous channels.

FIG. 1 is a diagram exemplarily illustrating a conventional audio connection type and an audio connection type to which the present disclosure is applicable.

FIG. 1(a) illustrates an example of a BR/EDR audio connection type. In the case of BR/EDR, one-to-one connection type is supported. One device (e.g., a smartphone) may function as a central device, and may be connected one-to-one with each of several devices. That is, there may be multiple one-to-one connections. Accordingly, the service such as a phone call through a headset or music reproduction through a speaker may be supported. The center of service in this connection type is an audio source, and an audio sink such as a headset, a speaker, and AVN (Audio Video Navigation) may operate as a peripheral device of the audio source.

FIG. 1(b) illustrates an example of a BLE audio connection type. In the case of BLE, many-to-many connections may be supported. In this case, there may be a plurality of center devices such as a TV, a smart phone, and a gateway etc., and complex M-to-N connection may be configured. Accordingly, services of phone calls and music reproduction through the headset may be supported, and broadcast audio services such as alarms, doorbells, and advertising voices may be supported. The center of the service in this connection type is an audio sink, and the audio service may be used by moving multiple audio sources.

Figure 2:
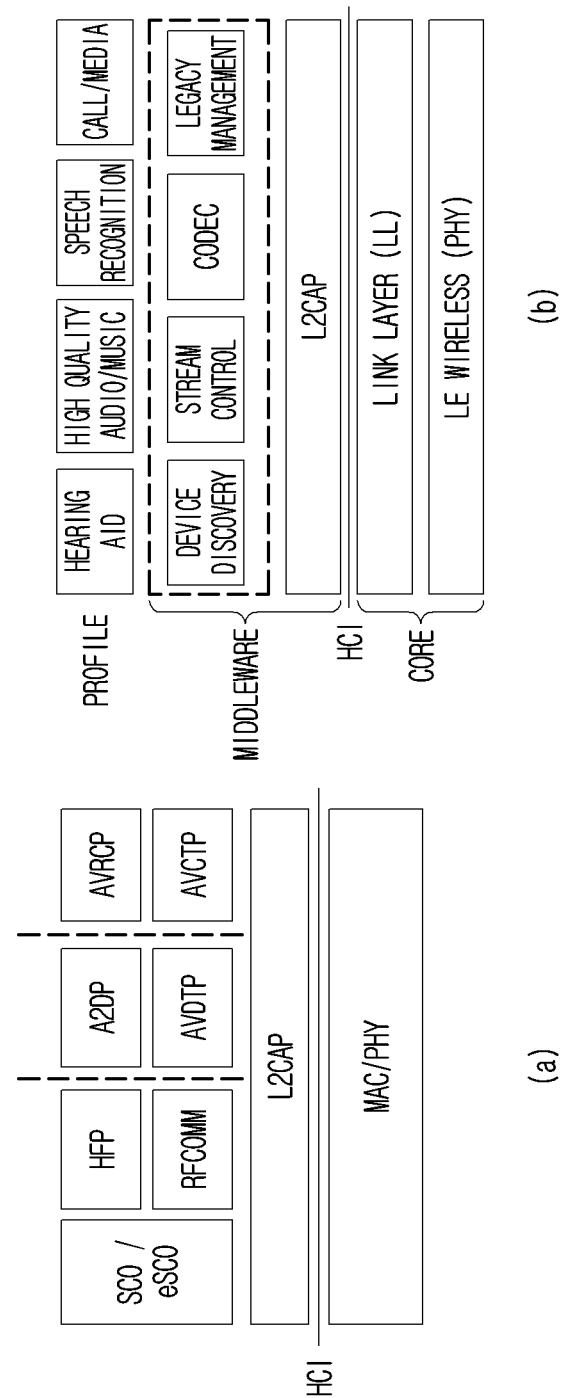
FIG. 2 is a diagram exemplarily illustrating a conventional audio-related protocol and an audio-related protocol stack to which the present is applicable.

FIG. 2 is a diagram exemplarily illustrating a conventional audio-related protocol stack and an audio-related protocol stack to which the present disclosure is applicable.

FIG. 2(a) illustrates an example of an audio-related protocol stack. L2CAP (Logical Link Control & Adaption Protocol) layer functions as arbitration and mediation between the upper layer and the lower layer. In the upper layer, protocols such as RFCOMM (Radio Frequency Communication), AVDTP (Audio/Video Distribution Transport Protocol), AVCTP (Audio/Video Control Transport Protocol) etc. and profiles such as HFP (Hands Free Profile), A2DP (Advanced Audio Distribution Profile), AVRCP (Audio/Video Remote Control Profile) etc. may be included. The lower layer may include a MAC/PHY layer. The MAC (Medium Access Control) layer may include a link manager and a link controller, and the PHY (Physical) layer may include a BR/EDR radio. In addition, Synchronous Connection Oriented (SCO)/extended SCO (eSCO) may provide a synchronous data communication path for voice. As such, in BR/EDR, a protocol stack may be designed for each profile. The L2CAP layer, the BR/EDR protocol, the Generic Access Profile (GAP), and the BR/EDR profile layer may be collectively referred to as the host layer, and the link manager, link controller, and BR/EDR radio layer may be referred to as the controller layer. The interface between the host and the controller may be referred to as a HCl (Host Controller Interface).

FIG. 2(b) illustrates an example of a BLE audio-related protocol stack. Unlike BR/EDR in which protocols are configured for each profile, in BLE, a common protocol stack for various profiles may be designed. This common protocol stack may be referred to as middleware. For example, a common protocol for various profiles such as hearing aids, high quality audio/music, voice recognition, and call/media in the form of middleware may be configured. For example, the middleware may include protocols such as device discovery, stream control (or stream management), codec, and legacy management. In addition, the core layer may include a link layer (Link Layer, LL), an LE Radio (i.e., a PHY layer), and the LL may include functions related to multicast support isochronous channels defined from Bluetooth 5.

In addition, the profile and middleware may be referred to as a host layer, the core layer may be referred to as a controller layer, and HCl may be defined between the host and the controller.

In addition to the host profile and protocol illustrated in FIG. 2(b), the host may include an LE profile, a generic access profile (GAP), a generic attribute profile (GATT), an Attribute (ATT) protocol, a security manager (SM), and the like.

Information transmitted from a host to a controller may be referred to as a HCl command packet. Information transmitted from a controller to a host may be referred to as a HCl event packet. In addition, HCl asynchronous data packets or HCl synchronous data packets may be exchanged between a host and a controller.

Also, in addition to the middleware profiles and services illustrated in FIG. 2(b), the middleware may include various profiles and/or services as follows:

Audio Session Capability Service (ASCS): Audio Session Capability Service (ASCS) is a service that supports to advertise or discover capabilities related to an audio session;

Audio Stream Session Service (Audio Stream Session Service, ASSS): Audio Stream Session Service (ASSS) is a service that supports discovery, setup, establishment, control, and management related to an audio session;

Audio Input Management Service (AIMS): a service for managing audio input volume, etc.;

Audio Routing Service (ARS): a service for selecting the location of audio inputs and outputs;

Audio Middleware Profile (AMP): a basic profile for the behavior of a device to distribute audio;

Call Management Profile (CMP): a profile of the roles and procedures of interaction between two devices for a call;

Audio General Middleware Profile (AGMP): a basic profile that enables content and/or stream control;

Group Identification Service (GIS): a service for the discovery of devices belonging to a group. A Group Identification Service (GIS) or Group Identification Profile (GIP) may allow devices to be discovered as part of a group. A group is defined as a group of devices that operate together to support a specific scenario, and these devices may be referred to as group members. For example, a group of devices that respond to a control command together, such as a pair of hearing aids, a pair of earbuds, or a set of speakers that receive multichannel (e.g., 5.1CH) audio, may be such examples:

Audio Player Management Profile (APMP): a profile that supports the control or interaction of an audio player;

Audio Player Management Service (APMS): a service that supports the control or interaction of an audio player;

Microphone Management Profile: a profile for microphone state management;

Microphone Management Service: a service that supports interfaces and states for microphone state management;

Quick Service Discovery Service (QSDS): a service that supports quick discovery of services such as audio player management and call management;

Call Bearer Service: a service that supports management of a call interface and a call state for a bearer on a device;

Volume Management Profile: a profile that supports audio volume management of a device;

Volume Management Service: a service that supports the device's audio volume interface and state;

Volume Offset Management Service: a service for volume management for audio output.

Figure 3:
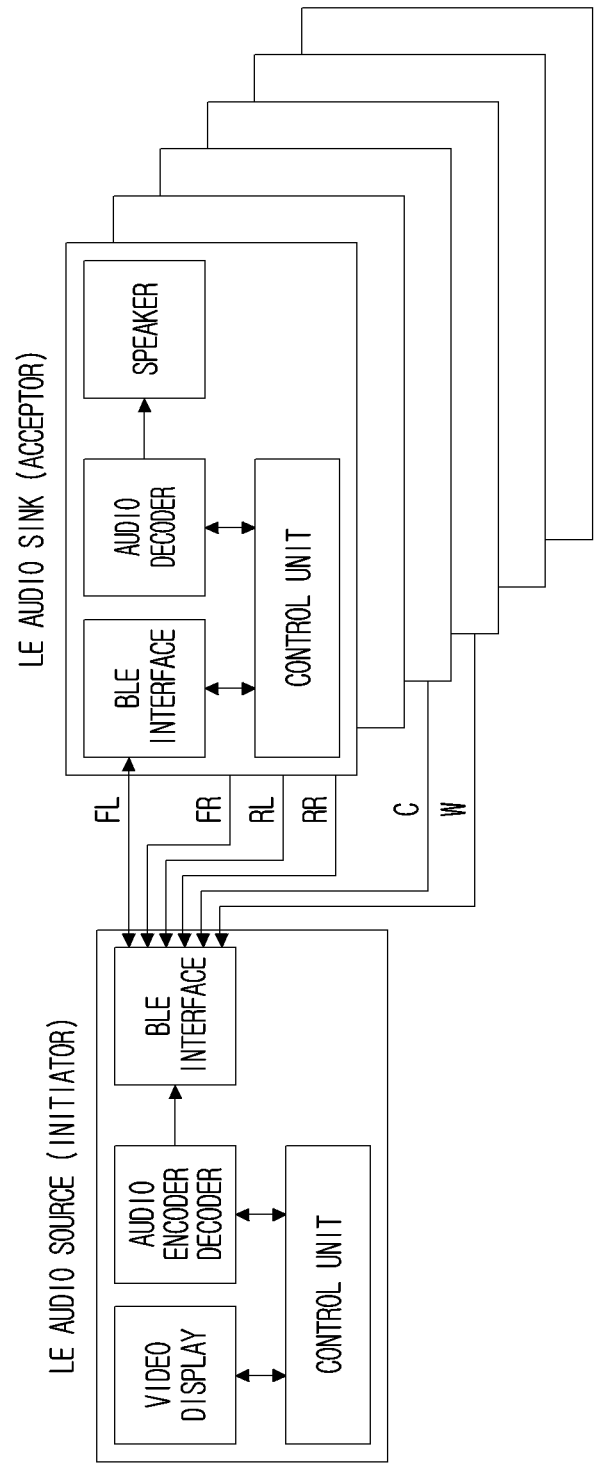
FIG. 3 is a diagram illustrating examples of 5.1 channel surround system hardware to which the present disclosure is applicable.

FIG. 3 illustrates examples of 5.1 channel surround system hardware to which the present disclosure is applicable.

In FIG. 3, a LE audio source device may perform a function of an initiator, and a LE audio sink device may perform a function of an acceptor. The initiator means a device that initiates an audio session, and the acceptor means a device that accepts the initiation of an audio session. Here, a source is not always the initiator or a sink is not always the acceptor, and the source may be the acceptor or the sink may be the initiator.

For example, an audio source may be a TV device, and an audio sink may be a speaker device. The audio source may transmit audio data to the audio sink. In addition, the audio source may receive feedback data from the audio sink. A plurality of audio sinks may receive audio data corresponding to one of 5.1 channels, respectively, FL (Front Left), FR (Front Right), RL (Rear Left), RR (Rear Right), C (Center), and W (Woofer) and output it through the speaker.

An audio encoder or decoder may support various audio formats. For example, the audio format may include Bluetooth Low Energy Audio Codec (BLEAC), Dolby 5.1CH, Digital Surround Sound (DTS), and the like, and the characteristics of each format are as follows. BLEAC is a mono codec, and the 96 kbps transmission rate of BLEAC may provide the same quality as 256 kbps of SBC (Sub-Band Codec) and 200 kbps of MP3. Dolby 5.1CH may support a 48 kHz sampling rate, support 1 to 5.1 (or 1 to 6) channels and support a transmission rate of up to 448 kbps. DTS may support 48 kHz or 96 kHz sampling rate, support 2 to 6.1 channels, and support transmission rates of 768 kbps half rate and 1,536 kbps full rate.

Figure 4:
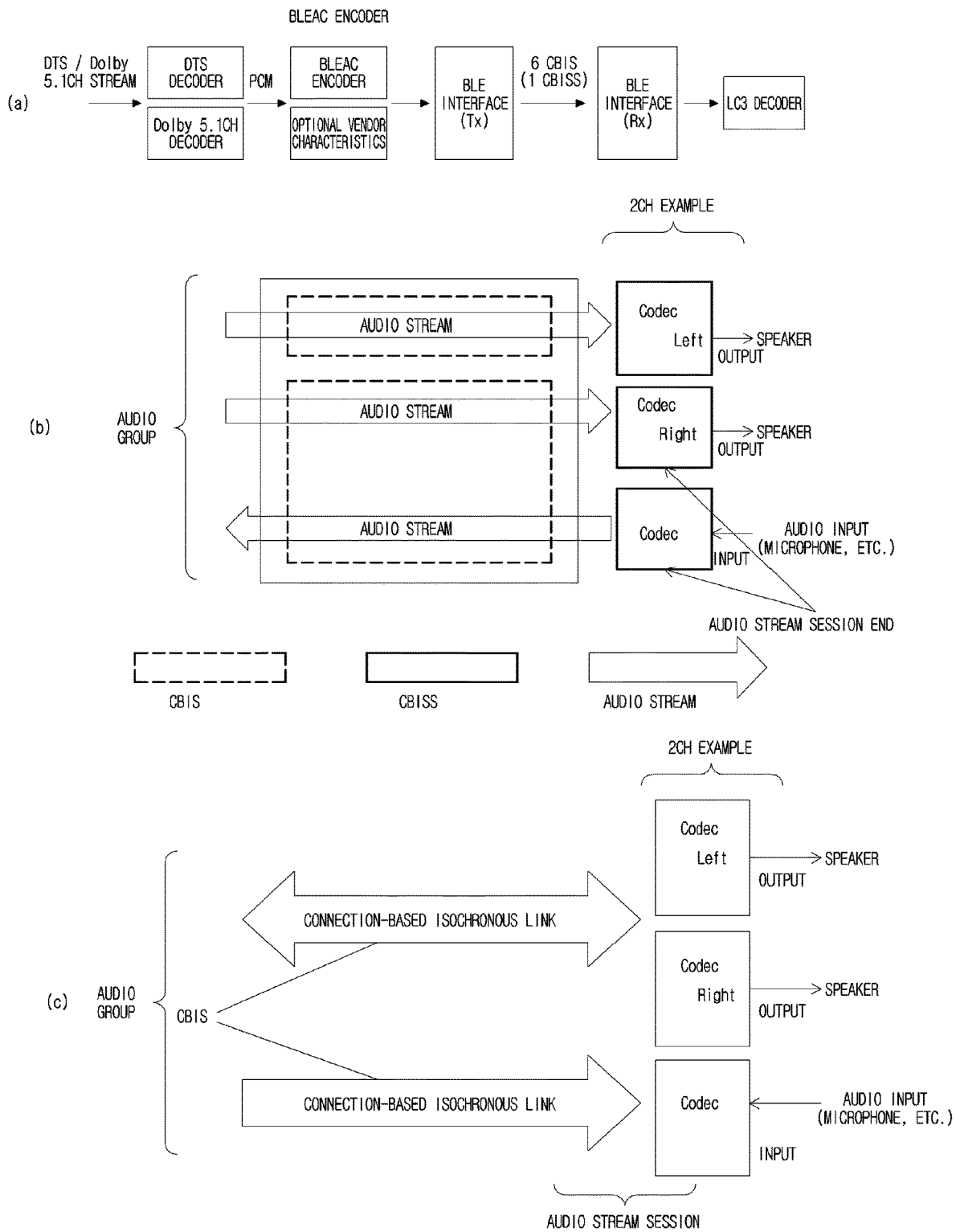
FIG. 4 is a diagram illustrating an audio data encoding/decoding process to which the present disclosure is applicable.

FIG. 4 is a diagram illustrating an audio data encoding/decoding process to which the present disclosure is applicable.

Referring to FIG. 4(a), a DTS format stream or a Dolby 5.1CH format stream may be input to a DTS decoder or a Dolby 5.1CH decoder of the transmitting end (Tx) and an audio signal in a PCM (Pulse-Code Modulation) format may be output. The PCM signal may be input to the BLEAC encoder and output as an audio signal in the BLEAC format. Here, optional vendor-specific information may be added. The BLEAC signal may be transmitted to the BLE interface of the receiving end (Rx) through the BLE interface. The receiving end may process the BLEAC signal through the BLEAC decoder and convert it into a signal that can be output through the speaker.

Here, a plurality of streams may be transmitted from a transmitting end to a plurality of receiving ends. For example, each of the plurality of streams may include an audio signal corresponding to one channel among 5.1 CHs. The plurality of streams may be received at different times from the plurality of receiving ends, but have isochronous properties that require play or rendering at the same time, and these streams may be called CBIS (Connection Based Isochronous Stream). That is, six CBISs corresponding to 5.1CH may be transmitted from a transmitting end to a receiving end, and a set of these six CBISs may be referred to as one CBISS (Connection Based Isochronous Steam Set).

FIGS. 4(b) and 4(c) conceptually illustrates audio streaming through a plurality of streams. One or more audio streams may correspond to CBIS, and an audio group may correspond to CBISS. For example, one audio stream may correspond to one CBIS, and two or more audio streams may correspond to one CBIS. A plurality of CBISs may be included in one audio group or CBISS.

Figure 5:
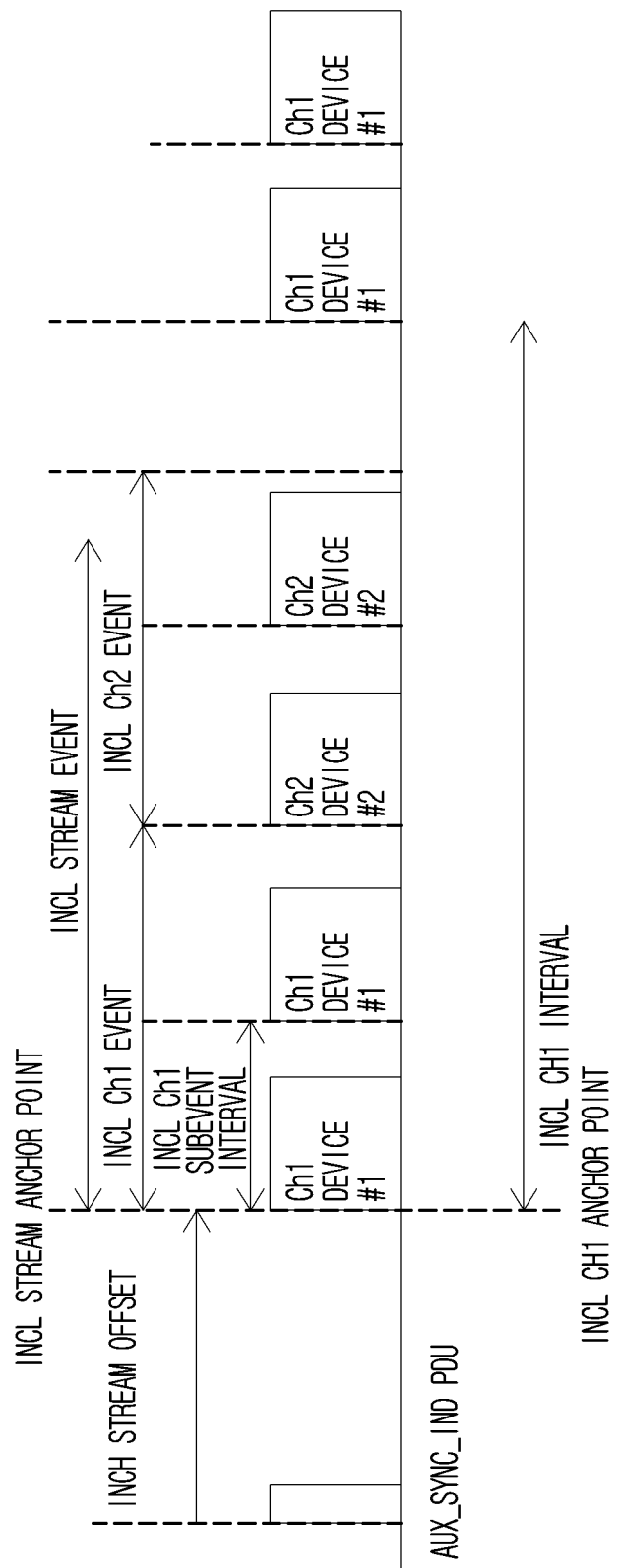
FIG. 5 is a diagram illustrating an example of channel allocation for two devices to which the present disclosure is applicable.

FIG. 5 is a diagram illustrating an example of channel allocation for two devices to which the present disclosure is applicable.

The receiving end may initiate stream reception according to timing information provided by the transmitting end. For example, the timing information may indicate a time point after a predetermined offset from a time point at which a data unit including the timing information is transmitted. The receiving end may receive audio data corresponding to one or more channels included in the stream. For example, a plurality of channels included in one stream may be allocated to a plurality of receiving ends, respectively. A plurality of channels (or a plurality of audio data) included in one stream may be transmitted in a time division multiplexing (TDM) method. For example, audio data of a first channel may be transmitted at a first timing, and audio data of a second channel may be transmitted at a second timing.

The broadcast receiving end may detect a currently obtainable broadcast audio stream, a stream offset value, a stream interval value, and the like, by using information included in a data unit periodically advertised by the transmitting end.

In the case of an Isochronous Non-Connection Link (INCL), which is a connectionless-based isochronous link, an isochronous channel may be transmitted/received (e.g., in a broadcast manner) without a connection between a source device and a sink device. From information such as BSG (Broadcast Synch Group) included in the AUX_SYNC_IND Protocol Data Unit (PDU) advertised by the transmitting end, the receiving end may check the INCL stream offset or BSG offset, and determine the anchor point timing. INCL stream transmission may start from the anchor point. A timing difference between two consecutive anchor points may be defined as an interval (e.g., an INCL CH1 interval or an ISO interval of FIG. 5). One or more sub-events may be included in the stream transmission event.

In the example of FIG. 5, one audio stream may include audio data for two channels. The first channel (CH1) may be allocated to the first device (device #1), and the second channel (CH2) may be allocated to the second device (device #2). At one or more timings after the anchor point, CH1 included in the INCL stream may be transmitted to the device #1, and thereafter, CH2 may be transmitted to the device #2 at one or more timings. In addition, the INCL stream event may include an event for CH1 and an event for CH2. An event for CH1 may include two sub-events. An event for CH2 may include two sub-events. A timing difference between sub-events may be defined as a sub-event interval.

Isochronous audio data may have a limited lifetime. That is, the audio data may be invalidated after the predetermined time has expired. For example, a predetermined timeout value may be defined in the ICL channel, and isochronous audio data transmitted to a plurality of devices may be discarded after the predetermined timeout value has expired. For example, a timeout may be expressed as a number of sub-events.

Figure 6:
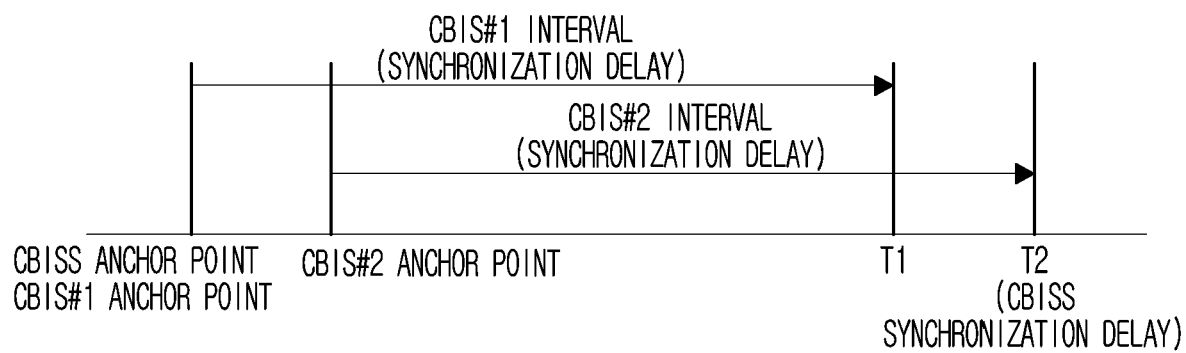
FIG. 6 is a diagram for describing a synchronization delay of two streams to which the present disclosure is applicable.

FIG. 6 is a diagram for describing a synchronization delay of two streams to which the present disclosure is applicable.

It is assumed that a plurality of streams are included in one audio group, and the plurality of streams have isochronism required to be reproduced at the same time. A plurality of streams may be transmitted from one device or may be transmitted from different devices. Also, the plurality of streams may be received by one device or may be received by different devices.

Since the Bluetooth communication method does not support simultaneous transmission of a plurality of streams, the plurality of streams may be transmitted in the TDM method on different time resources (or timings) according to a predetermined order. In this case, a difference may occur in the transmission timing of the plurality of streams, and accordingly, a difference may also occur in the reception timing of the plurality of streams. In addition, since a plurality of streams are required to be reproduced simultaneously, the stream received first cannot be reproduced first, but may be reproduced after waiting until the last stream is received. That is, a synchronization delay may occur until a timing at which reception of all streams is completed.

In the example of FIG. 6, the first stream (CBIS #1) and the second stream (CBIS #2) may be required to be reproduced simultaneously, and may be included in one CBISS. The CBISS anchor point may be same as the anchor point of CBIS #1, and after the CBIS #1 audio data may be transmitted, CBIS #1 audio data subsequent to the time point (e.g., T1) after the CBIS #1 interval may be transmitted. Next, after CBIS #2 audio data is transmitted from the anchor point of CBIS #2, CBIS #2 audio data subsequent to a time point after the CBIS #2 interval (e.g., T2) may be transmitted. After all streams included in one CBISS are received, they may be reproduced simultaneously. That is, the audio data of CBIS #1 and CBIS #2 may be processed and reproduced at the time of completion of reception of CBIS #2, which is transmitted relatively late.

Here, the synchronization delay of the CBISS may be defined as a time interval until the reception completion time (T2) of CBIS #2, which is received relatively late from the CBISS. For example, the later time point among the reception completion time T1 of CBIS #1 and the reception completion time T2 of CBIS #2 may be determined as the synchronization delay of the CBISS. That is, a later reception completion time among synchronization delays of a plurality of streams may be determined as a synchronization delay of the CBISS. Specifically, when CBIS #1 and CBIS #2 are bundled into the same single CBISS, the previously received stream CBIS #1 may be reproduced after waiting until the received stream CBIS #2 information is transmitted.

The transmitting end (Tx) may inform the receiving end (Rx) of an expected delay value calculated in consideration of the number of CBISs, CBIS events, sub-events, and intervals in advance. For example, the transmitting end may inform the receiving end of the expected delay value when configuring the channel.

In the case of a connection-based isochronous connection link (ICL), since the transmitting end and the receiving end are connected, the receiving end may inform the transmitting end of the actual delay value.

In the case of INCL, since the transmitting end and the receiving end are not connected, the receiving end cannot inform the transmitting end of the actual delay value. Even if the delay value may be informed from the receiving end to the transmitting end, the transmitting end cannot control the playback time of a specific device in order to synchronize the plurality of devices.

For example, even in the case of INCL, when a plurality of CBISs (e.g., six CBISs corresponding to six channels of 5.1CH) are included in one CBISS, the transmitting end may receive feedback from the receiver to adjust synchronization. Through the feedback, the receiving end may inform the transmitting end of its delay information.

Figure 7:
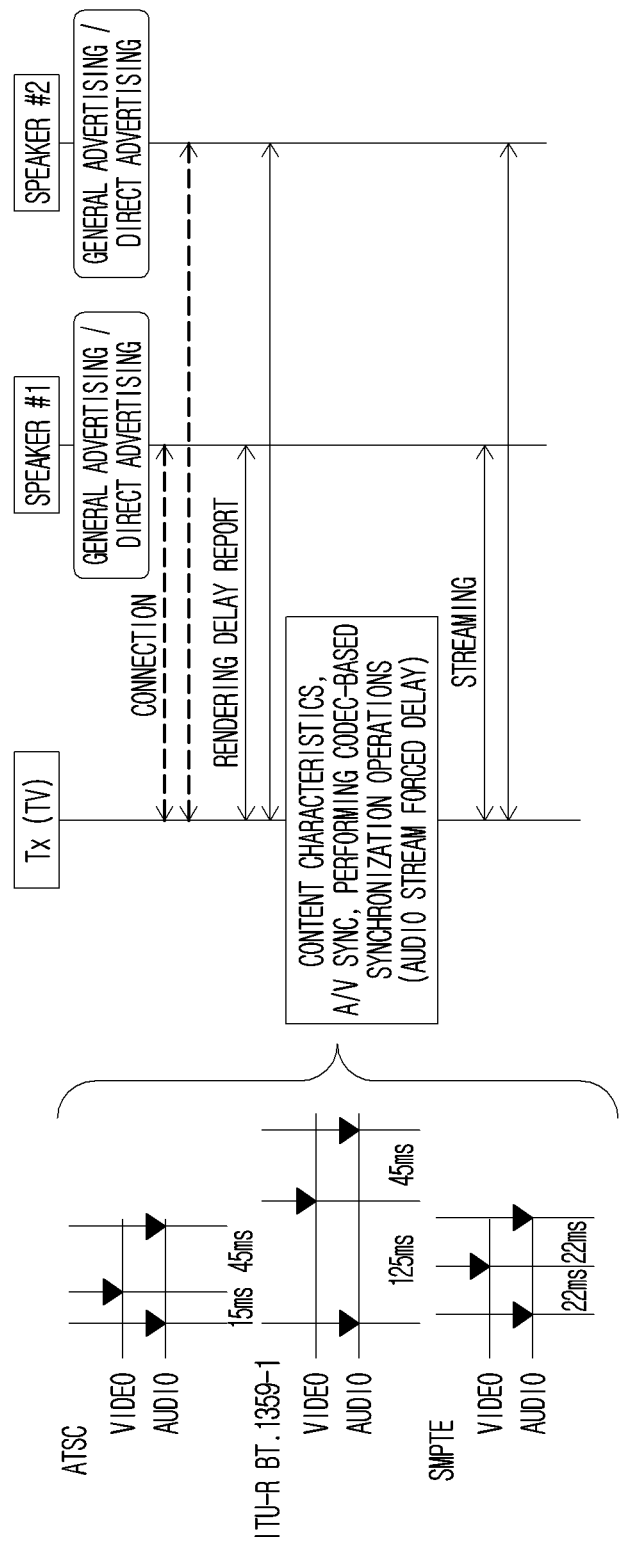
FIG. 7 is a diagram for describing a broadcast operation for a plurality of devices to which the present disclosure is applicable.

FIG. 7 is a diagram for describing a broadcast operation for a plurality of devices to which the present disclosure is applicable.

The audio source device may calculate a synchronization delay value for simultaneous reproduction of isochronous streams and transmit it to a plurality of audio sink devices. Each of the sink devices may determine the playback timing based on the delay value provided from the source device. That is, since the source device cannot accurately know the amount of time the sink device takes to receive and process audio data, the sink device may provide the delay value as basic information for determining the playback timing. The sink device may determine a reproduction timing according to its device characteristics and reproduce audio data.

For example, in an Isochronous Broadcast operation, a source device (e.g., a TV) may calculate a transmission delay, a rendering delay, etc., and transmit to a sink device (e.g., speaker). The sink device may adjust playback or rendering timing of audio data by reflecting the received delay value. Since device characteristics are different for each sink device manufacturer, the actual playback timing may be determined by the sink device.

If the sink device can transmit information to the source device, the sink, the sink device may calculate a delay value and transmit to the source device. Accordingly, the source device may determine the transmission timing based on the delay value provided from the sink device.

For example, a feedback channel may be formed through which a sink device (e.g., a speaker) may communicate information to a source device (e.g., a TV). In this case, a unicast operation based on an isochronous connection may be performed. The sink device may calculate a rendering delay value and transmit it to the source device through a feedback channel. Accordingly, the source device may adjust the transmission time of the audio data by reflecting the delay value provided from the sink device.

Referring to FIG. 7, an isochronous stream operation is exemplarily illustrated in the case where a transmitting end is a TV, and two receiving ends are a first speaker (speaker #1) and a second speaker (speaker #2). The first speaker may be allocated a first stream/channel (e.g., RR channel in 5.1CH), and the second speaker may be allocated a second stream/channel (e.g., RL channel in 5.1CH).

The first and second speakers may transmit an audio general advertisement or an audio directed advertisement, respectively. At least one of the TV and the first speaker or the second speaker may or may not be connected to each other.

When at least one of the TV and the speaker is connected, the speaker may calculate a rendering delay value and report it to the TV. When the TV and the speaker are not connected, the TV may calculate the transmission delay, rendering delay value, and the like, and send it to the speaker.

The TV may perform a synchronization operation in consideration of audio content characteristics, audio/video synch, codec characteristics, and the like, and forcibly apply a delay to a specific audio stream. For example, since the audio codec encoding/decoding delay is different from 40 ms for BLEAC, 200 ms for SBC, 100 ms for APT-X, etc., the delay value may be determined according to codec characteristics. In addition, since characteristics of A/V content are different according to games, movies, animations, and the like, a delay value may be determined in consideration of this. Also, a delay value may be determined in consideration of a difference between a media clock and a clock of the BLE interface. The media clock may be confirmed through A/V time scale information.

In addition, as shown on the left side of FIG. 7, a delay value may be determined in consideration of audio/video signal processing time defined in various broadcasting standards. For example, the time interval between audio-video-audio is 15 ms and 45 ms in Advanced Television Systems Committee (ATSC), 125 ms and 45 ms in ITU-R BT.1359-1, and SMPTE (Society of Motion Picture and Television Engineers) It is defined as 22 ms and 22 ms, and a delay value may be determined in consideration of these time intervals.

The TV may configure the rendering delay value of each stream and inform the speaker, or determine the transmission timing of the stream based on the delay value provided from the speaker.

The TV may transmit a stream to the speaker based on the determined delay value. That is, the source device or the TV which is the transmitting end may exchange a delay value with the sink device and the speaker(s) which is the receiving end, and may perform an operation of synchronizing by reflecting the delay value.

Figure 8:
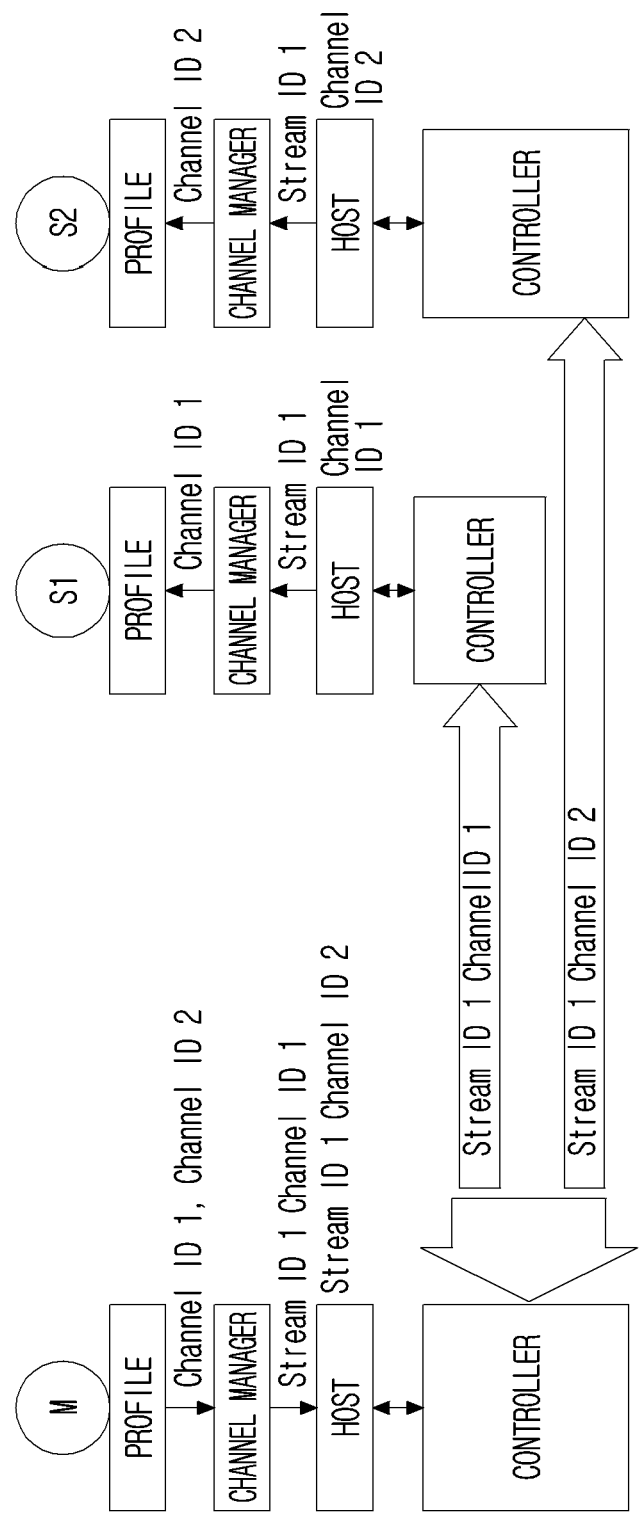
FIG. 8 and FIG. 9 are diagrams for describing the operation of the ICL type and the INCL type to which the present disclosure is applicable.
Figure 9:
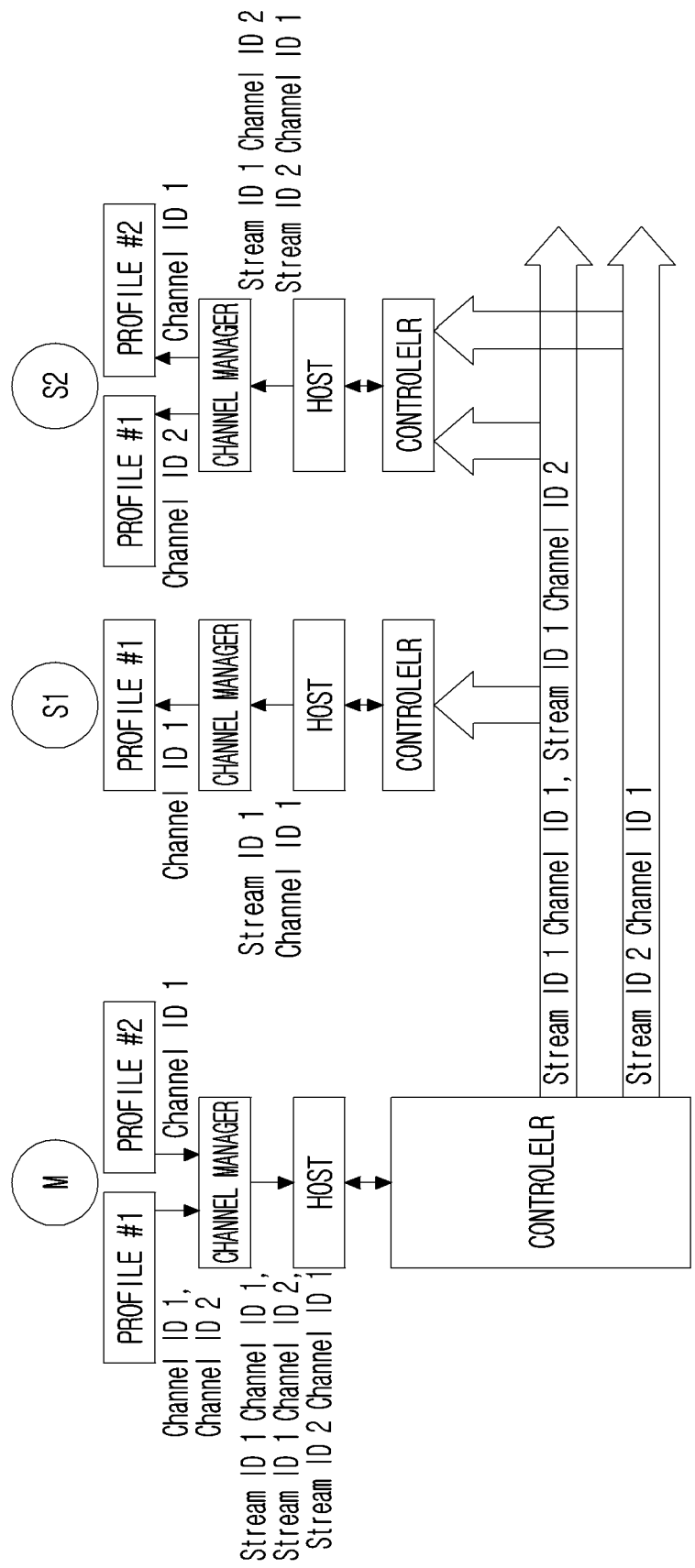

FIG. 8 and FIG. 9 are diagrams for describing the operation of a ICL type and a INCL type to which the present disclosure is applicable.

In BLE, a channel for audio transmission may be classified into an ICL type and an INCL type. Both the ICL channel and the INCL channel may transmit audio data to multiple devices and/or multiple profiles using a stream ID and a channel ID. According to the ICL type and the INCL type, it may be determined what operation is to be performed on the BLE channel for audio data transmission.

ICL channels correspond to a connection-based use case that supports unidirectional or bidirectional communication through a point-to-point physical link between one source device and one sink device. In addition, INCL channels correspond to a broadcast use case that supports only unidirectional communication through a point-to-multipoint physical link between one source device and one or more sink devices.

The protocol stack of the device may include a profile layer, a channel manager layer, a host layer, and a controller layer in order from an upper layer to a lower layer. Data may be transferred between the profile layer and the channel manager layer in units of channels, and data may be transferred between the channel manager layer and the host layer in units of streams.

Referring to FIG. 8, in case of the ICL type, a connection between a master (M) and the first slave S1 and a connection between the master M and the second slave S2. In this case, it is possible to divide two channels included in one stream by a channel identifier and transmit to the two slaves. That is, channel ID 1 may be allocated to the S1 and channel ID 2 may be allocated to the S2. Both the channel ID 1 and the Channel ID 2 may be transmitted through the same stream ID 1. In addition, since bidirectional communication is possible based on the connection, the slaves may provide feedback information to the master M. For example, when S1 is a wireless earphone mounted on the right ear and S2 is a wireless earphone mounted on the left ear, it is possible to listen to music transmitted by the master M in stereo through S1 and S2.

Referring to FIG. 9, in the case of the INCL type, there is no connection between the master M and the slaves (S1, S2), and the slaves may synchronize with a INCL stream offset, an event, a timing of the sub-event based on the synchronization information advertised by the master and may receive broadcast audio data. In addition, the master M may include two profiles (profile #1 and profile #2). The first slave S1 may include the profile #1, and the second slave S2 may include the profile #1 and the profile #2. In Profile #1, the channel ID 1 and the channel ID 2 may be broadcast from the master M through one stream, Stream ID 1, and it is similar to FIG. 8 that the slaves S1 and S2 respectively receive the channel ID 1 and the channel ID in Profile #1. Additionally, in profile #2, the channel ID 1 may be broadcast from the master M through Stream ID 2, and the second slave S2 may receive Channel ID 1 in profile #2.

Figure 10:
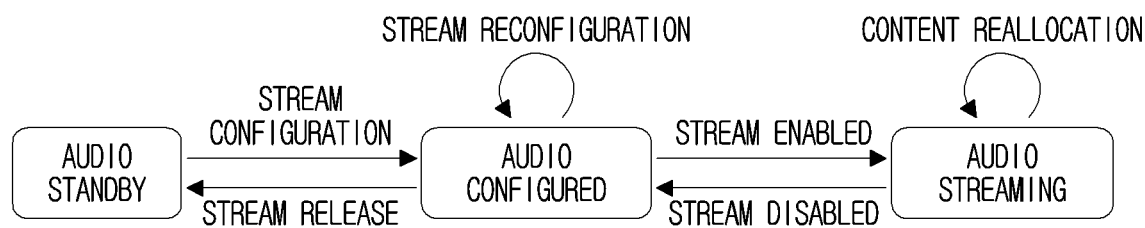
FIG. 10 is a diagram illustrating a broadcast audio stream state machine to which the present disclosure is applicable.

FIG. 10 is a diagram illustrating a broadcast audio stream state machine to which the present disclosure is applicable.

The control of the broadcast audio stream may be described as a broadcast audio stream state machine and state transition at the broadcast transmitting end.

The broadcast audio stream state machine may allow a broadcast transmitter to communicate with one or more broadcast receivers (or broadcast discovery clients) in a one-way manner without a connection or not with a broadcast receiver (or broadcast discovery client). The broadcast transmitter may communicate using a broadcast audio advertisement in the form of a Broadcast Audio Source Session (BASS). A broadcast audio stream may be transmitted by a broadcast transmitter.

The AUDIO STANDBY state means state in which a broadcast audio stream is not transmitted.

The AUDIO CONFIGURED state means a state in which a broadcast receiver (or a broadcast discovery initiator) starts advertising information for detecting an audio stream through a periodic advertising event. The periodic advertising event may include delivering advertisement metadata, stream configuration, synchronization information, and the like. In this state, no audio data packet is transmitted from the broadcast transmitter.

The AUDIO STREAMING state means a state in which a broadcast audio stream is enabled in a broadcast transmitter and an audio data packet may be transmitted. The broadcast transmitter may continuously perform metadata advertising through periodic advertising while transmitting the broadcast audio stream. If a stream is configured in the AUDIO STANDBY state, it may transition to the AUDIO CONFIGURED state, and if the stream is released in the AUDIO CONFIGURED state, it may transition to the AUDIO STANDBY state. If a stream is enabled in the AUDIO CONFIGURED state, it may transition to the AUDIO STREAMING state, and if the stream is disabled in the AUDIO STREAMING state, it may transition to the AUDIO CONFIGURED state. If a stream reconfiguration occurs in the AUDIO CONFIGURED state, it may transition to the AUDIO CONFIGURED state. When content reassignment occurs in the AUDIO STREAMING state, it may transition to the AUDIO STREAMING state.

Figure 11:
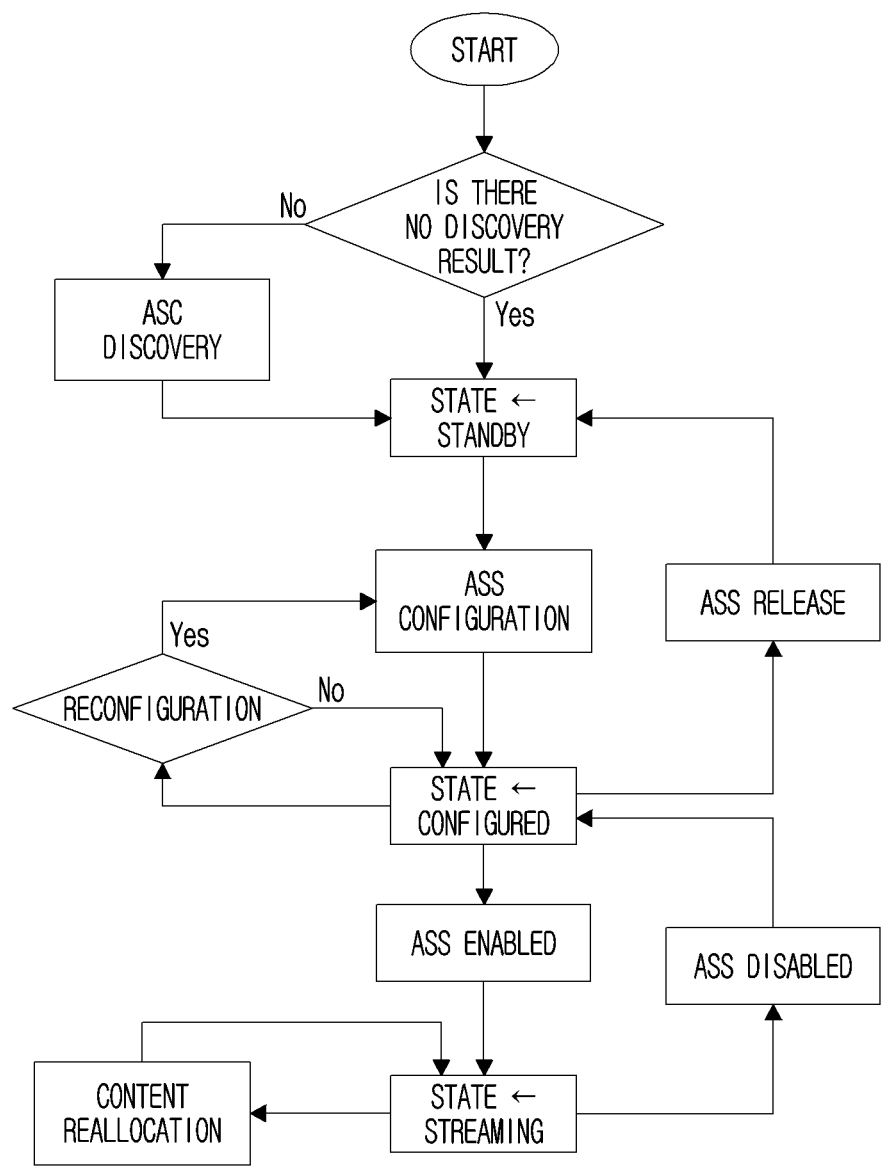
FIG. 11 is a diagram illustrating an audio setup procedure to which the present disclosure is applicable.

FIG. 11 is a diagram illustrating an audio setup procedure to which the present disclosure is applicable.

When there is no discovery result (that is, zero discovery), the AUDIO STANDBY state may be transitioned, and if there is a discovery result, discovery for Audio Stream Capability (ASC) may be performed and transition to the AUDIO STANDBY state.

When an ASS (Audio Stream Session) configuration occurs, it may transition to the AUDIO CONFIGURED state. If ASS is released in the AUDIO CONFIGURED state, it may transition to the AUDIO STANDBY state. When reconfiguration occurs in the AUDIO CONFIGURED state, it may transition to the AUDIO CONFIGURED state through the ASS configuration.

When ASS is activated, it may transition to AUDIO STREAMING state. If ASS deactivation occurs in the AUDIO STREAMING state, it may transition to the AUDIO CONFIGURED state. If content reassignment occurs in the AUDIO STREAMING state, it may transition to the AUDIO STREAMING state.

Figure 12:
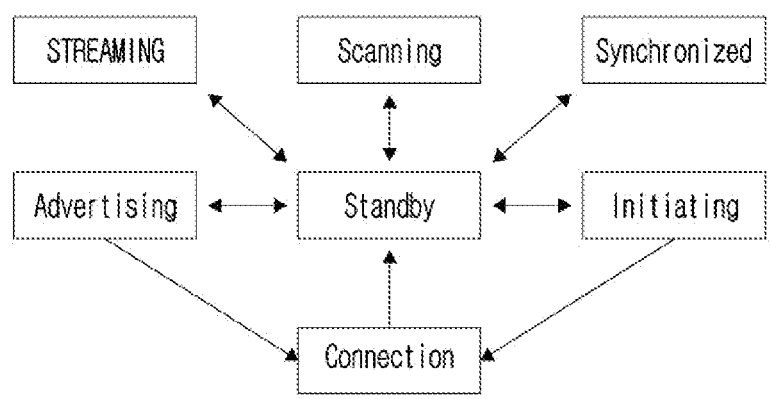
FIG. 12 is a diagram illustrating a link layer state machine to which the present disclosure is applicable.

FIG. 12 is a diagram illustrating a link layer state machine to which the present disclosure is applicable.

The operation of the link layer LL may be expressed as (in terms of an isochronous channel) Standby state, Advertising state, Scanning state, Initiating state, Connection state, Synchronized (synchronization) state, and Streaming (Isochronous Broadcasting) state.

The Standby state corresponds to a standby state before transitioning to another state.

In the Advertising state, the LL may operate as a advertiser transmitting an advertising packet. When a connection is established in the advertising state, the device may operate as a slave.

In the Initiating state, the LL may act as an initiator that listens for packets from other advertisers and initiates a connection in response to the packets. When a connection is established in the initiating state, the device may operate as a master.

In the Scanning state, the LL may act as a scanner that listens for packets from other advertisers and requests additional information.

The synchronized state may refer to a state in which an audio stream may be received or received in synchronization with another device.

The streaming state may refer to a state in which an audio stream is transmitted to another synchronized device.

Figure 13:
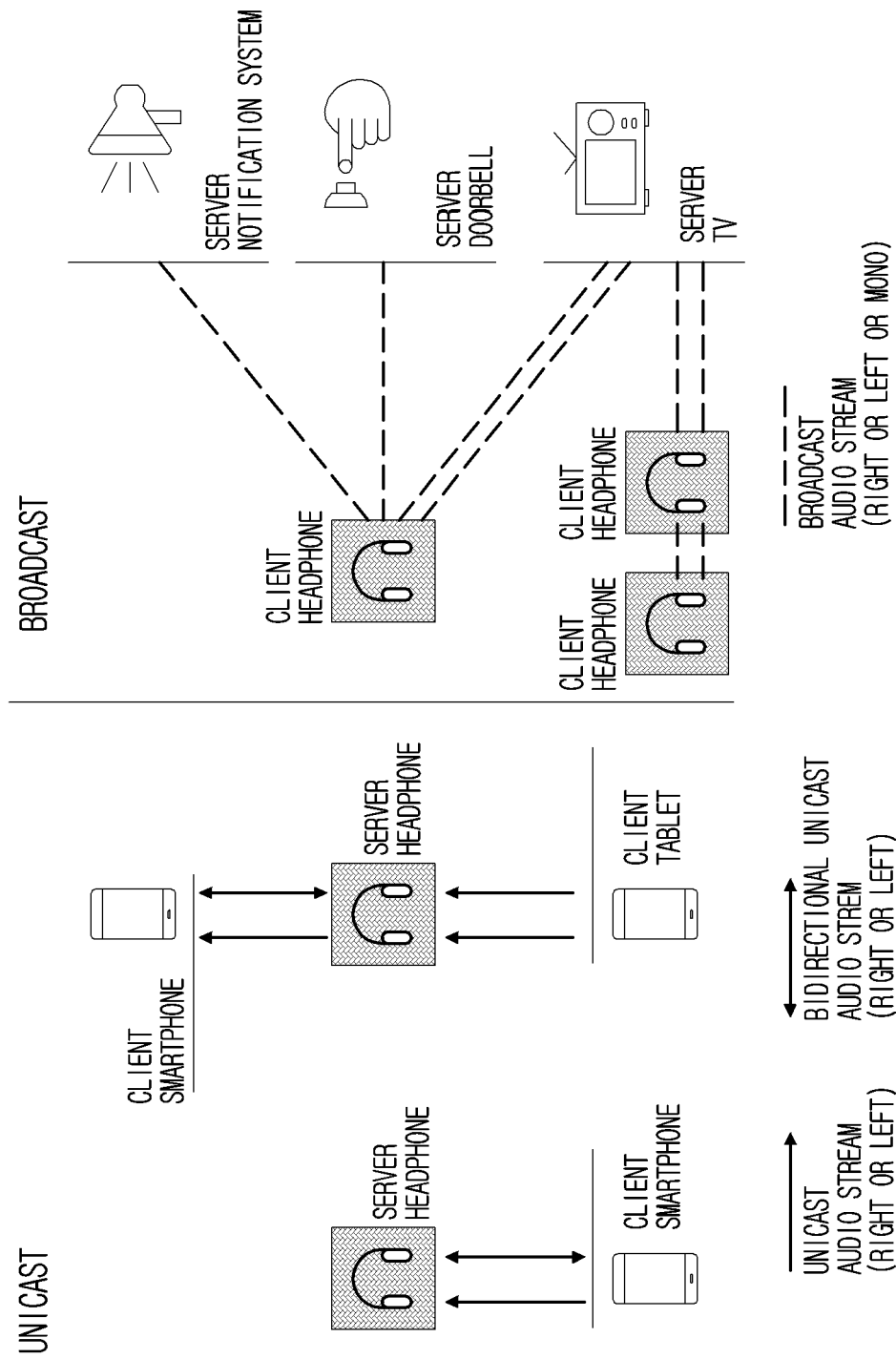
FIG. 13 is a diagram illustrating an example of an audio topology to which the present disclosure is applicable.

FIG. 13 is a diagram illustrating an audio topology to which the present disclosure is applicable.

In the case of unicast, unidirectional or bidirectional audio streams may be supported. Unicast audio data transmission/reception based on a connection between a headset and a smartphone may be performed, and the unicast audio data transmission/reception based on a connection between a headset and a smartphone and a connection between the headset and a tablet may be performed. In this case, the server of the unicast audio service may be a headphone, and the client may be a smartphone or tablet. Also, headphones may correspond to an audio sink, and a smartphone or tablet may correspond to an audio source.

In the case of broadcast, a notification system, a doorbell, a TV, etc. may transmit audio data in a broadcast manner, and one or more devices may receive the broadcast audio data. In this case, the server of the broadcast audio service may be a notification system, a doorbell, a TV, or the like, and the client may be a headphone. Also, the headphones may correspond to an audio sink, and a notification system, a doorbell, and a TV may correspond to an audio source.

Figure 14:
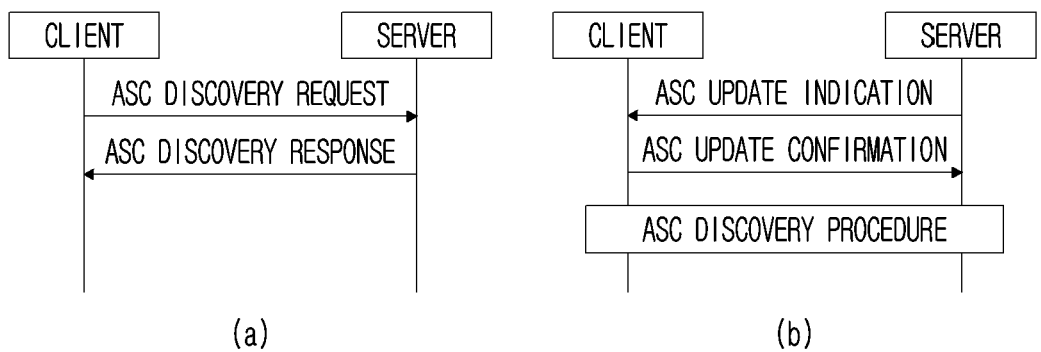
FIG. 14 to FIG. 16 are diagrams illustrating a message exchange process between a server and a client to which the present disclosure is applicable.
Figure 15:
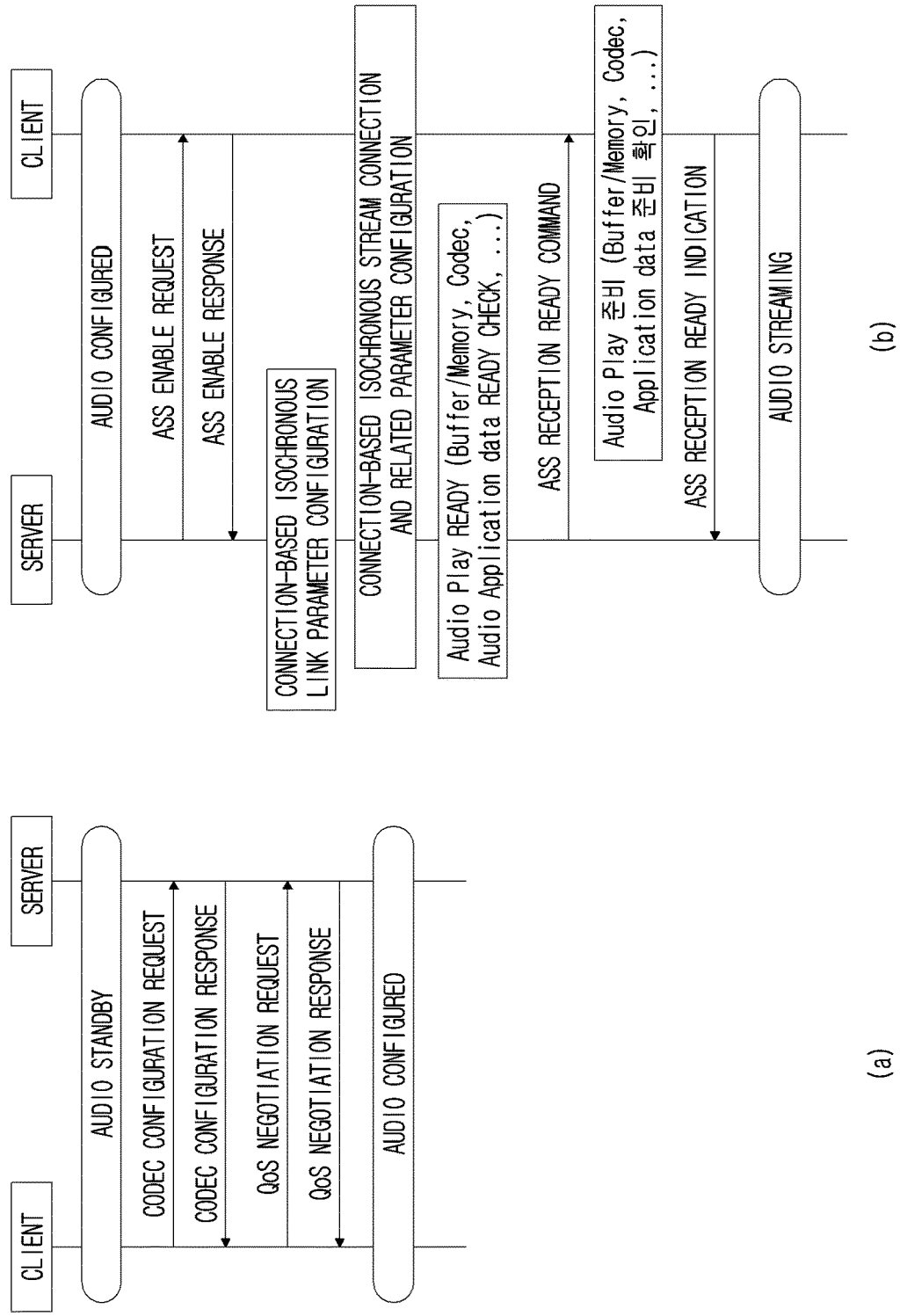
Figure 16:
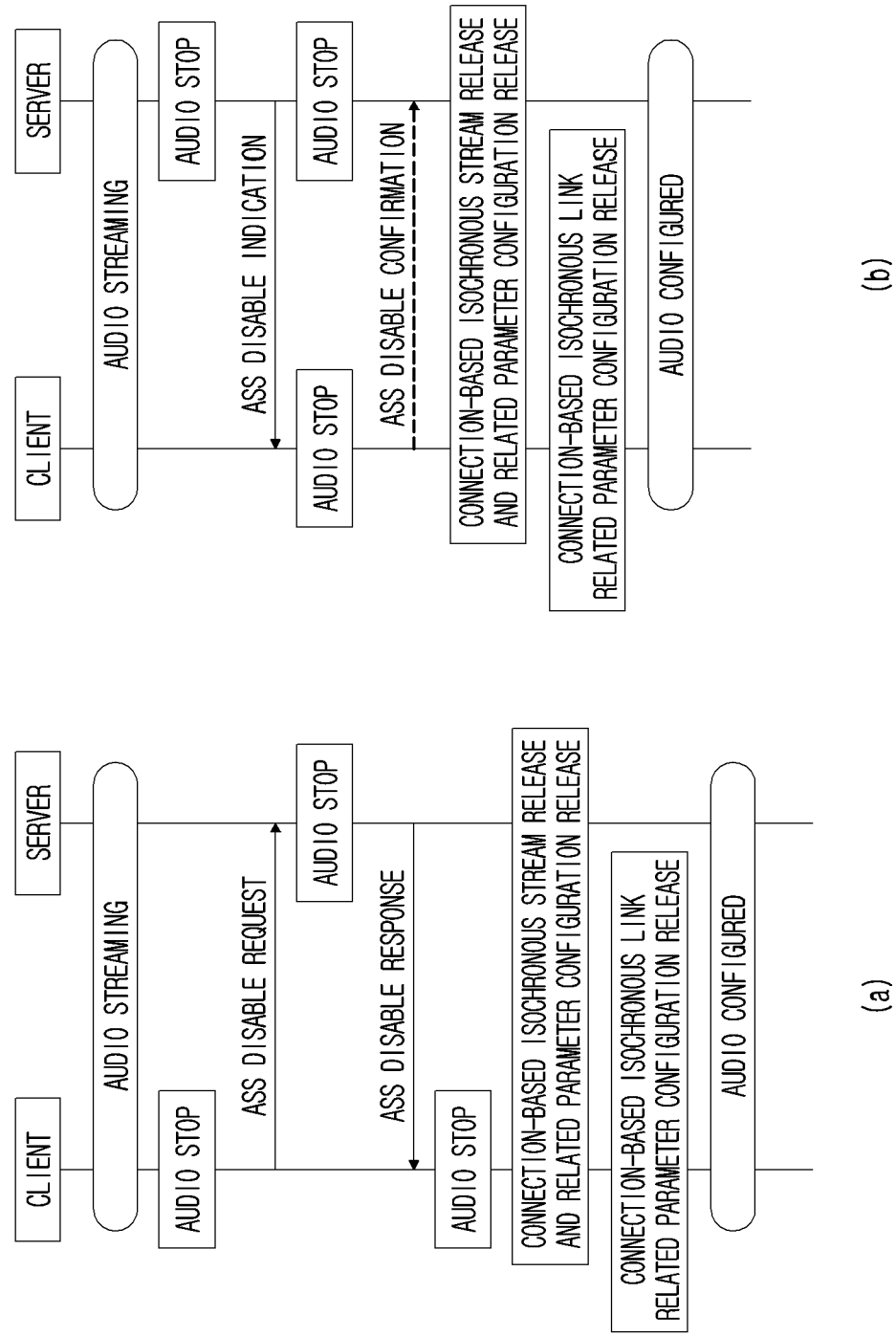

FIG. 14 to FIG. 16 are diagrams illustrating a message exchange procedure between a server and a client to which the present disclosure is applicable.

In the example of FIG. 14 to FIG. 16, the client may be an audio source and the server may be an audio sink. Or, the client may be an audio sink and the server may be an audio source.

FIG. 14 exemplarily illustrates an audio session capability (ASC) discovery procedure and an ASC update procedure.

In the audio session capability discovery procedure of FIG. 14(*a*), the client may request capability discovery by transmitting an ASC discovery request message to the server, and in response to that, the server may transmit detailed information of the capability by transmitting an ASC discovery response message to the client.

In the audio session capability update procedure of FIG. 14(b), the server may transmit an ASC update indication message to the client to inform that the capability update has occurred, and the client may notify the server to perform a capability update by transmitting an ASC update confirmation message. Subsequently, an audio session capability discovery procedure or an ASC discovery procedure may be performed.

The format of the message used in the example of FIG. 14 may be defined as shown in Table 1 below.

TABLE 1

ASC_DISCOVERY REQUEST
Direction
ASC_DISCOVERY RESPONSE
Sink Locations: Bitmap
Source Locations: Bitmap
Number of ASC Records
Direction
Codec ID
Sampling Frequency
Codec Specific
Content Protection Type
Content Protection type Specific The ASC update indication message and the ASC update confirmation message may include information indicating that ASC discovery is required and confirmation information therefor, respectively.

FIG. 15 exemplarily illustrate a unicast audio stream configuration procedure and an unicast audio stream establishment procedure.

In the unicast audio stream configuration procedure of FIG. 15(a), the client, in the AUDIO STANDBY state, may transmit a Codec configuration request message to the server to inform the server of the codec requesting configuration, and the like. In response, the server may transmit a codec configuration response message to the client to inform the server of QoS and rendering delay values supported by the server. In addition, the client may transmit a QoS negotiation request message to the server to specify a specific audio stream session (ASS), an audio group, and an audio stream to inform the client of QoS and rendering delay values supported by the client. In response, the server may transmit a QoS negotiation response message to the client. Accordingly, bandwidth (BW), bitrate, etc. may be determined by negotiation between the client and the server, and the client and the server may transition to a CONFIGURED state.

In the unicast audio stream establishment procedure of FIG. 15(b), the client may transmit an ASS enable request message to the server in the AUDIO CONFIGURED state to inform information on the ASS requesting activation. In response, the server may transmit an ASS enable response message to the client to inform about which ASS to activate. Configuration for connection-based isochronous link parameters may be performed at the client, and CBIS may be established by the client and the server configuring the connection-based isochronous stream connection and related parameters. If the client is the audio sink and the server is the audio source, the server may prepare to play audio data and transmit an ASS Rx ready indication message to the client, and the client may prepare to provide audio data after receiving the ASS reception ready indication notification message. Accordingly, the client and the server may transition to the AUDIO STREAMING state.

The format of the message used in the example of FIG. 15 may be defined as shown in table 2 below.

TABLE 2

CODEC CONFIGURATION REQUEST
ASS ID
ASA ID
Direction
Codec ID
Sampling Frequency
Codec Specific
CODEC CONFIGURATION RESPONSE
ASS ID
Server Supported QoS (Interleaved, Framed, Latency)
Presentation delay
QOS NEGOTIATION REQUEST
ASS ID
CBISS id
CBIS ID
Client QoS (Transport Latency)
Rendering Delay
QOS NEGOTIATION RESPONSE
ASS ID
ASS ENABLE REQUEST/ASS ENABLE RESPONSE
Number of ASS ID
ASS ID
ASA ID
Content Type
ASS RX READY COMMAND/ASS RX READY NOTIFICATION
Number of ASS ID
ASS ID FIG. 16 exemplarily illustrates a procedure for disabling an audio stream by a client and a procedure for disabling an audio stream by a server.

In the procedure of the client disable audio streams in FIG. 16(a), if the client is an audio source and the server is an audio sink, when the client decides to stop the audio in the AUDIO STREAMING state, an ASS disable request message may be transmitted to the server. Accordingly, the server may stop streaming audio data and transmit an ASS disable response message to the client. Upon receiving this, the client may stop audio data encoding and audio application operation.

Alternatively, if the client is an audio sink and the server is an audio source, the client may stop audio data streaming and transmit ASS disable request message to the client. Accordingly, the server may stop audio data encoding and audio application operation and transmit an ASS disable response message to the client.

After that, the client and the server may perform connection-based isochronous stream release and related parameter setting release. Here, in preparation for reconnection between the client and the server, device information may be stored in the client and/or the server together with an isochronous stream connection related parameter. Accordingly, the client may release the connection-based isochronous link related parameter setting. Accordingly, the client and the server may transition to the AUDIO CONFIGURED state.

In the example of FIG. 16(b), in the procedure of disabling audio streams by the server, if the server is an audio source and the client is an audio sink, when the server decides to stop audio in the AUDIO STREAMING state, an ASS disable indication message may be transmitted to the client. Accordingly, the client may stop streaming audio data and may or may not transmit an ASS disable confirmation message to the server. The server may stop encoding audio data and audio application operation with or without receiving an ASS deactivation response.

Alternatively, if the server is an audio sink and the client is an audio source, the server may stop audio data streaming and transmit an ASS disable indication message to the client. Accordingly, the client may stop the audio data encoding and audio application operation, and may or may not transmit an ASS disable confirmation message to the server.

After that, the client and the server may perform connection-based isochronous stream release and related parameter configuration release. Here, in preparation for reconnection between the client and the server, device information may be stored in the client and/or the server together with an isochronous stream connection related parameter. Accordingly, the client may release the connection-based isochronous link related parameter configuration. Accordingly, the client and the server may transition to the AUDIO CONFIGURED state.

The format of the message used in the example of FIG. 16 may be defined as shown in table 3 below.

TABLE 3

ASS DISABLE REQUEST/ASS DISABLE RESPONSE/ASS DISABLE INDICATION
Number of ASS ID
ASS ID
(No Contents)

Table 4 below exemplarily shows content reallocation request/response, ASS release request/response, general advertisement, and directed advertisement message formats.

TABLE 4

Figure 17:
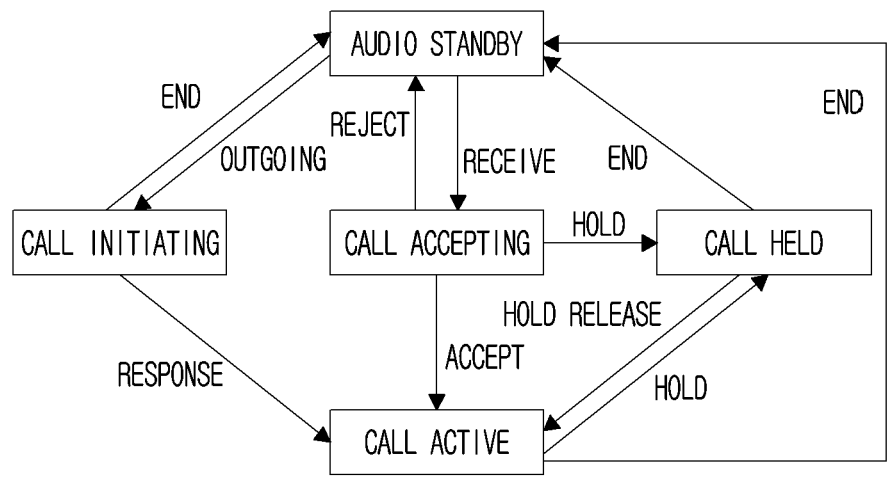
FIG. 17 is a diagram illustrating state machine for a call service to which the present disclosure is applicable.

REASSIGN CONTENT REQUEST/REASSIGN CONTENT RESPONSE
Number of ASS ID
ASS ID
ASA ID
Content Type
ASS RELEASE REQUEST/ASS RELEASE RESPONSE
ASS ID
GENERAL ADVERTISEMENT
DIRECTED ADVERTISEMENT
Content Type
Meta data FIG. 17 is a diagram illustrating a state machine for a call service to which the present disclosure is applicable.

When a call is received in the AUDIO STANDBY state, it may transition to the CALL ACCEPTING state. When a call is accepted in the CALL ACCEPTING state, it may transition to the CALL ACTIVE state. When a call is rejected in the CALL ACCEPTING state, it may transition to the AUDIO STANDBY state. In the case of hold in which a call cannot be received in the CALL ACCEPTING state, it may transition to the CALL HELD state, and may transition to the CALL ACTIVE state when the hold is released in the CALL HELD state. When the CALL HELD state or the CALL ACTIVE state is terminated, it may transition to the AUDIO STANDBY state.

Also, When a call is outgoing in the AUDIO STANDBY sate, it may transition to the CALL INITIATING state. When it answers a call from a remote location or the other party in the CALL INITIATING state, it may transition to the CALL ACTIVE state. When it ends in the CALL INITIATING state, it may transition to the AUDIO STANDBY state.

In such a call service state machine, audio data that needs to be delivered to the headset in the AUDIO STANDBY state may occur. For example, audio data may be transmitted to the headset when a response when a phone number is dialed is notified by sound.

Alternatively, information definitively indicating various wireless access technology (e.g., 2G, 3G, 4G, 5G, Wi-Fi, GSM, CDMA, WCDMA, etc.) related to the call service. For example, For example, a bearer technology field having a size of 1 octet may be defined. This may be related to the aforementioned call bearer service.

In the case of multiway calling, a plurality of lines may exist, and a state machine as shown in FIG. 17 may be maintained for each line. For example, when the second line transitions from the AUDIO STANDBY state to the CALL ACCEPTING state while the first line is in the CALL ACTIVE state, the first or the second line may transition to the CALL HELD state according to the user's control.

Hereinafter, logical links of Bluetooth system and logical transports will be described.

A variety of logical links may be used to support different application data transfer requirements. Each logical link is associated with a logical transport, which may have various characteristics. These characteristics may include flow control, acknowledgment/repeat mechanisms, sequence numbering and scheduling operations, and the like. A logical transport may carry various types of logical links depending on its type. A plurality of logical links may be multiplexed into the same single logical transport. A logical transport may be carried by a physical link on a particular channel.

Logical transport identification and real-time (link control) signaling may be included in the packet header, and specific logical link identification may be included in the header of the payload.

Table 5 below exemplarily illustrates logical transport types, supported logical link types, supported physical link and physical channel types, and descriptions of logical transports.

TABLE 5

| Logical transport | Links supported | Supported by | Bearer | Overview |
|---|---|---|---|---|
| Connection based Isochronous Stream | Stream (framed or unframed) LE-S or LE-F | LE isochronous physical link | LE | Unidirectional or bidirectional transport in a point-to-point connection for transferring isochronous data, |
| Broadcast | Stream | LE isochronous | LE | Unidirectional |

TABLE 5-continued

| Logical transport | Links supported | Supported by | Bearer | Overview |
|---|---|---|---|---|
| Isochronous Stream | (framed or unframed) LE-S (or LE-F) and Control (LEB-C) | physical link | | transport for broadcasting data in a point to multipoint configuration and unidirectional transport for controlling the broadcast data |

Figure 18:
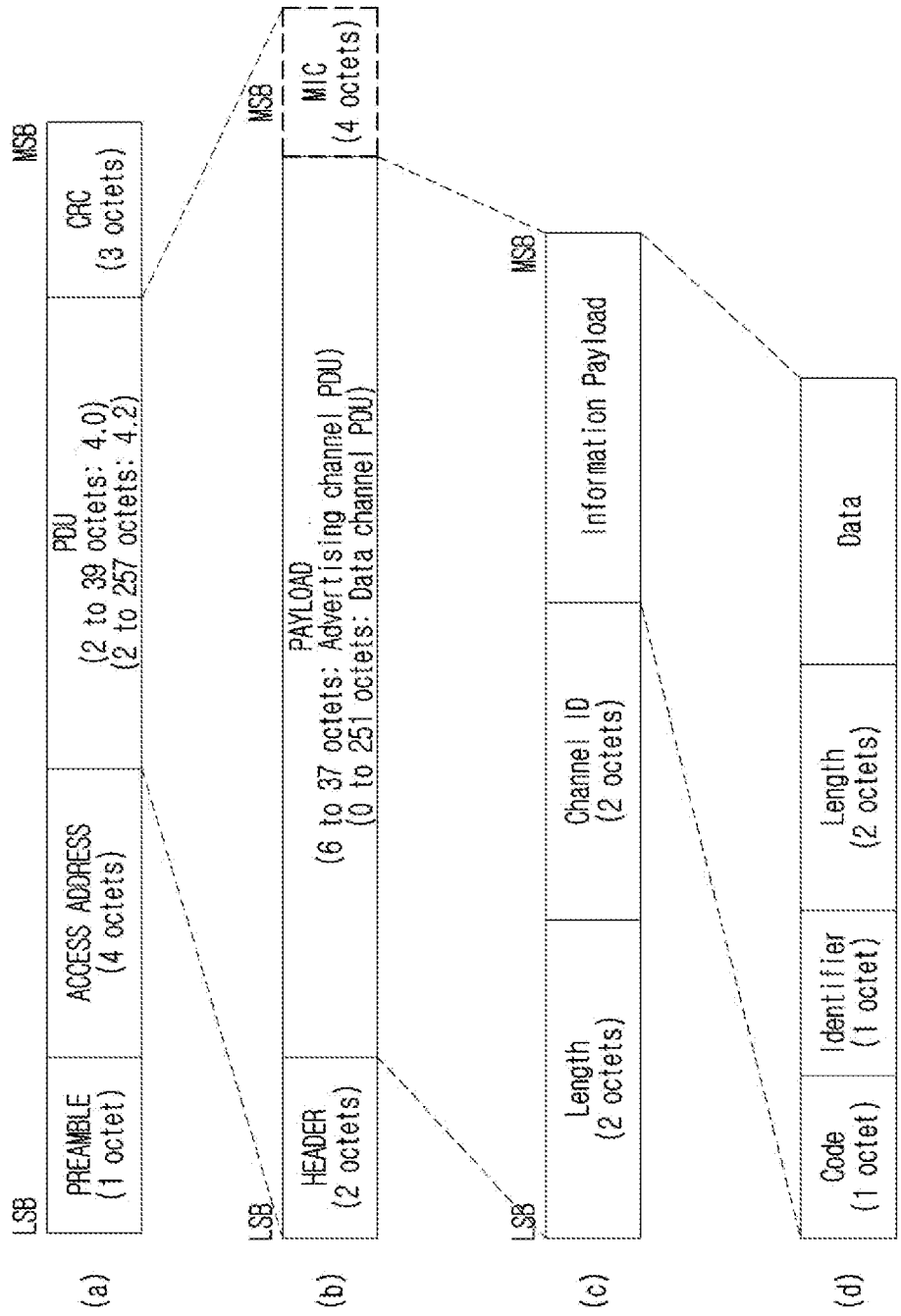
FIG. 18 is a diagram illustrating a packet format for each layer to which the present disclosure is applicable.

FIG. 18 is a diagram illustrating a packet format for each layer to which the present disclosure is applicable.

FIG. 18(a) illustrates an example of link layer (LL) packet format. The LL packet format may include a preamble, an access address (or an access code), a PDU, and a Cyclic Redundancy Code (CRC) field. The preamble may have a size of 1 octet, may be used for frequency synchronization, symbol timing estimation, automatic gain control (AGC) training, and the like at the receiving side, and may be configured with a predetermined bit sequence. The access address may have a size of 4 octets and may be used as a correlation code for a physical channel. A PDU may be defined with a size of 2 to 39 octets in Bluetooth 4.0 version, and may be defined as a size of 2 to 257 octets in version 4.2. The CRC may include a value calculated as a 24-bit long checksum for the PDU.

FIG. 18(b) illustrates an exemplary format of the PDU of FIG. 18(a). PDU may be defined in two types, one is a data channel PDU (Data channel PDU), the other is an advertising channel PDU (Advertising channel PDU). The data channel PDU will be described in detail with reference to FIG. 19, and the advertising channel PDU will be described in detail with reference to FIG. 20.

FIG. 18(c) illustrates an example of an L2CAP PDU format, which may correspond to an exemplary format of the payload field of FIG. 18(b). The L2CAP PDU may include a Length, a Channel ID, and an Information Payload field. The length field may indicate the size of the information payload, and the information payload field may include higher layer data. The channel identifier field may indicate which upper layer data the information payload field includes. For example, if the value of the channel identifier field is 0x0004, it may indicate ATT (ATTribute protocol), if the value of the channel identifier field is 0x0004, it may indicate SMP (Security Manager Protocol), or another channel identifier indicating a different type of upper layer or middleware Values may be defined and used.

When the L2CAP packet of FIG. 18(c) is an L2CAP PDU (i.e., a control frame) transmitted on a signaling channel, the information payload field of FIG. 18(c) may be configured as shown in FIG. 18(d). The information payload field may include a code (Code), an identifier (Identifier), a length (Length) and data (Data) fields. For example, the code field may indicate the type of the L2CAP signaling message. The identifier field may include a value that matches the request and the response. The length field may indicate the size of the data field. Data fields may contain attributes. An attribute is a unit of arbitrary data, and may include, for example, data at various points in time in various states of the device, such as location, size, weight, temperature, and speed.

An attribute may have a format including an attribute type, an attribute handle, an attribute value, and an attribute permission.

The attribute type may include a value indicating the type of attribute data identified by a Universally Unique Identifier (UUID).

The attribute handle may contain a value assigned by the server to identify attribute data.

The attribute value may include the value of attribute data.

Attribute permission may be configured by GATT (Generic ATTribute profile), and may include a value indicating the type of allowed access (e.g., whether it can read/write, whether encryption is required, whether authentication is required, whether authorization is required, etc.) to the corresponding attribute data.

In point of view of an Attribute protocol (ATT)/Generic Attribute Profile (GATT), a device may serve as a server and/or a client. The server may serve to provide attributes and related values, and the client may play a role of discovering, reading, or writing attributes on the server.

In ATT/GATT, it may support the transmission and reception of attribute data between the server and the client. For this, the PDU supported by the ATT protocol may include six method types, that is, request, response, command, notification, indication, and confirmation.

A request is sent from the client to the server, and a response from the server is required. A response is sent from the server to the client, and is sent when there is a request from the client. A command is sent from the client to the server, and no response is required. A notification is sent from the server to the client, and confirmation is not required. An indication is sent from the server to the client, and confirmation of the client is required. A confirmation is sent from the client to the server, and is sent when there is an instruction from the server.

In addition, GATT may support various profiles. The structure of the GATT-based profile may be described as a service (service) and characteristics (characteristics). A device may support one or more profiles. One profile may include zero or one or more services. A plurality of profiles may use the same service. One service may include one or more characteristics. A characteristic means a data value that is the subject of read, write, indicate, or notify. That is, a service may be understood as a data structure used to describe a specific function or feature, and a service that is a combination of characteristics may indicate an operation performed by a device. All services are implemented by the server and may be accessed by one or more clients.

Figure 19:
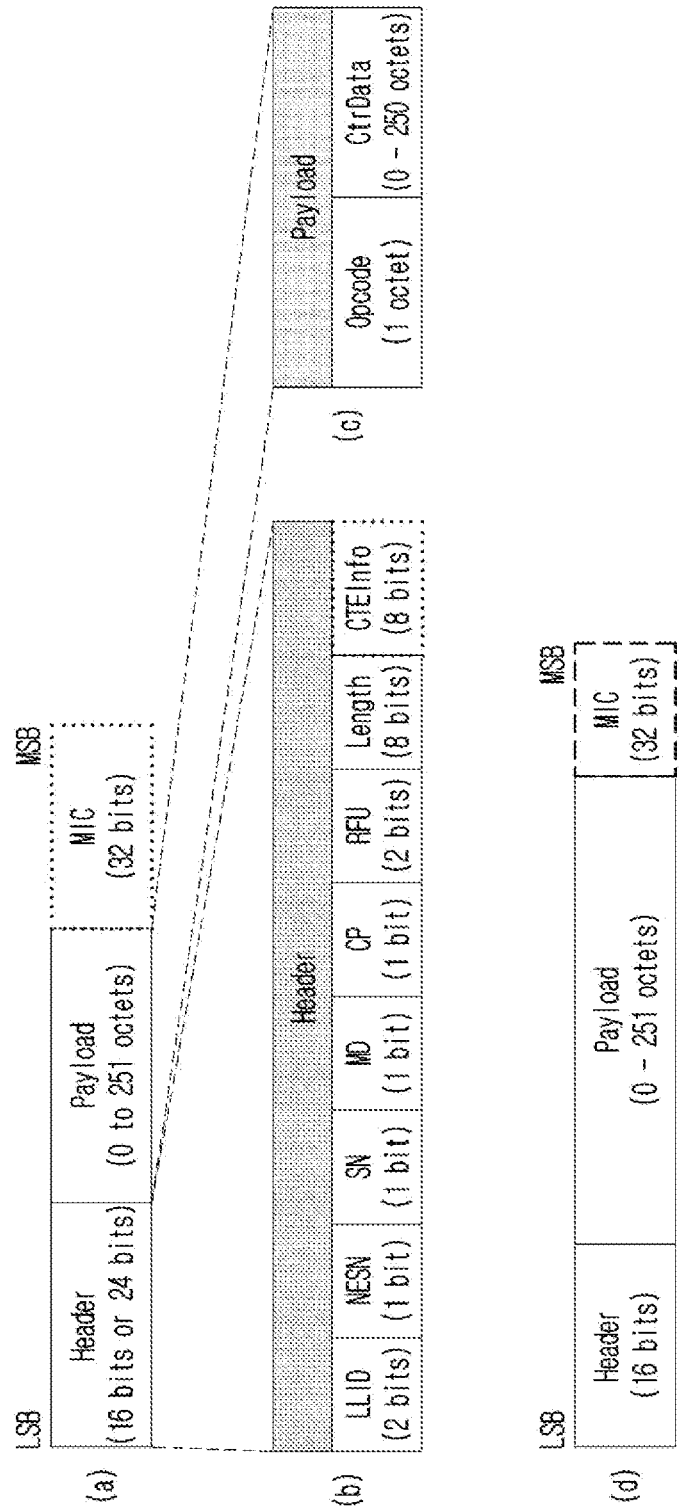
FIG. 19 is a diagram illustrating examples of a data unit format to which the present disclosure is applicable.

FIG. 19 is a diagram illustrating examples of a data unit format to which the present disclosure is applicable.

FIG. 19(a) illustrates an exemplary format of a data physical channel PDU (Protocol Data Unit). The data channel PDU may be used to transmit a packet on the data physical channel (e.g., channel number 0 to 36). The data physical channel PDU includes a 16 or 24 bit length header and a variable size (e.g., 0 to 251 octet size) payload, and may further include a Message Integrity Check (MIC) field. For example, the MIC field may be included in the case of an encrypted link layer connection in which the payload field size is not 0.

As shown in FIG. 19(b), the header fields may include LLID (Logical Link Identifier), NESN (Next Expected Sequence Number), SN (Sequence Number), MD (More Data), CP (CTEInfo Present), RFU (Reserved). for Future Use). The RFU corresponds to a part reserved for future use when necessary, and its value may be usually filled with 0. Also, according to the value of the CP field, the header field may further include a Constant Tone Extension Information (CTEInfo) subfield. In addition, the Length field may indicate the size of the payload, and when the MIC is included, it may indicate the length of the payload and the MIC.

FIG. 19(c) illustrates an exemplary format of an LL Control PDU. The LL Control PDU may correspond to a data physical channel PDU used to control link layer connection. The LL Control PDU may have a fixed value according to an operation code (Opcode). The Opcode field may indicate the type of the LL Control PDU. The control data (CtrData) field may have various formats and lengths specified by the Opcode.

For example, the Opcode of the LL Control PDU may have a value (e.g., 0x1F, 0x20, 0x21, 0x22, ... ) indicating one of LL_CBIS_REQ, LL_CBIS_RSP, LL_CBIS_IND, LL_CBIS_TERMINATE_IND, LL_CBIS_SDU_CONFIG_REQ, and LL_CBIS_SDU_CONFIG_RSP.

When the opcode indicates LL_CBIS_REQ, the CtrData field may include information necessary for a CBIS request together with CBISS identification information and CBIS identification information. Similarly, in each case where the Opcode indicates one of LL_CBIS_RSP, LL_CBIS_IND, LL_CBIS_TERMINATE_IND, LL_CBIS_SDU_CONFIG_REQ, LL_CBIS_SDU_CONFIG_RSP, the CtrData may include information required for a CBIS response, a CBIS indication, a CBIS termination indication, a CBIS Service Data Unit (SDU) setup request, and a CBIS SDU setup response.

FIG. 19(d) illustrates an example of audio data PDU format.

Audio data PDU may be CBIS PUD or broadcast isochronous PDU. When used in a CBIS stream, the audio data PDU may be defined as CBIS PDU. When used in a broadcast isochronous PDU, the audio data PDU may be defined as broadcast isochronous PDU.

The audio data PDU may include a 16-bit length header field and a variable length payload field. Also, the audio data PDU may further include a MIC field.

In the case of a CBIS PDU, the format of the header field may include 2-bit LLID, 1-bit NESN, 1-bit SN, 1-bit Close Isochronous Event (CIE), 1-bit RFU, 1-bit Null PDU Indicator (NPI), 1-bit RFU, 9-bit Length subfield.

In the case of broadcast isochronous PUD, the format of the header field may include 2-bit LLID, 3-bit Control Subevent Sequence Number (CSSN), 1-bit Control Subevent Transmission Number (CSTF), 2-bit RFU, and 8-bit Length subfield.

The payload field of audio data PDU may include audio data.

Figure 20:
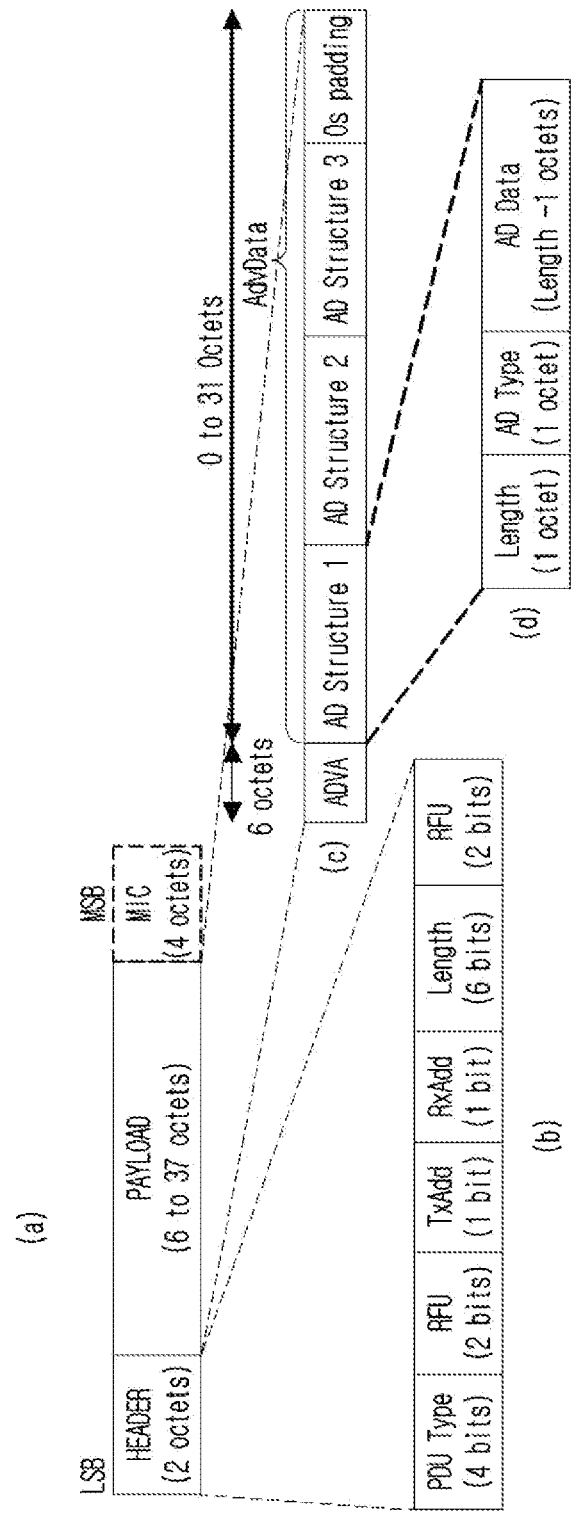
FIG. 20 is a diagram illustrating examples of an advertisement unit format to which the present disclosure is applicable.

FIG. 20 is a diagram illustrating examples of an advertisement unit format to which the present disclosure is applicable.

FIG. 20(a) shows an exemplary format of an Advertising Physical Channel PDU (Protocol Data Unit). The advertising channel PDU may be used to transmit packets on an advertising physical channel (e.g., channel numbers 37, 38, 39). The advertising channel PDU may consist of a header of 2 octets and a payload of 6 to 37 octets.

FIG. 20(b) shows an exemplary format of a header of an advertising channel PDU. The header may include a PDU type, a Reserved for Future Use (RFU), a transmission address (TxAdd), a reception address (RxAdd), a length (Length), and an RFU field. The length field of the header may indicate the size of the payload.

FIG. 20(c) shows an exemplary format of a payload of an advertising channel PDU. The payload may include an Advertiser Address (AdvA) field with a length of 6 octets and an AdvData field with a length of 0 to 31 octets. The AdvA field may include a public address or a random address of the advertiser. The AdvData field may include zero or more advertising data (AD) structures, and padding if necessary.

FIG. 20(d) shows a format of one AD structure. The AD structure may include three fields. A length field may indicate a length of a AD Data field. That is, a value obtained by subtracting 1 from the value indicated by the length field may correspond to the length of the AD Data field. The AD Type field may indicate a type of data included in the AD Data field. The AD Data field may include advertising data provided from a host of an advertiser.

Hereinafter, embodiments for controlling and managing a state of a peripheral device according to the present disclosure will be described.

Figure 21:
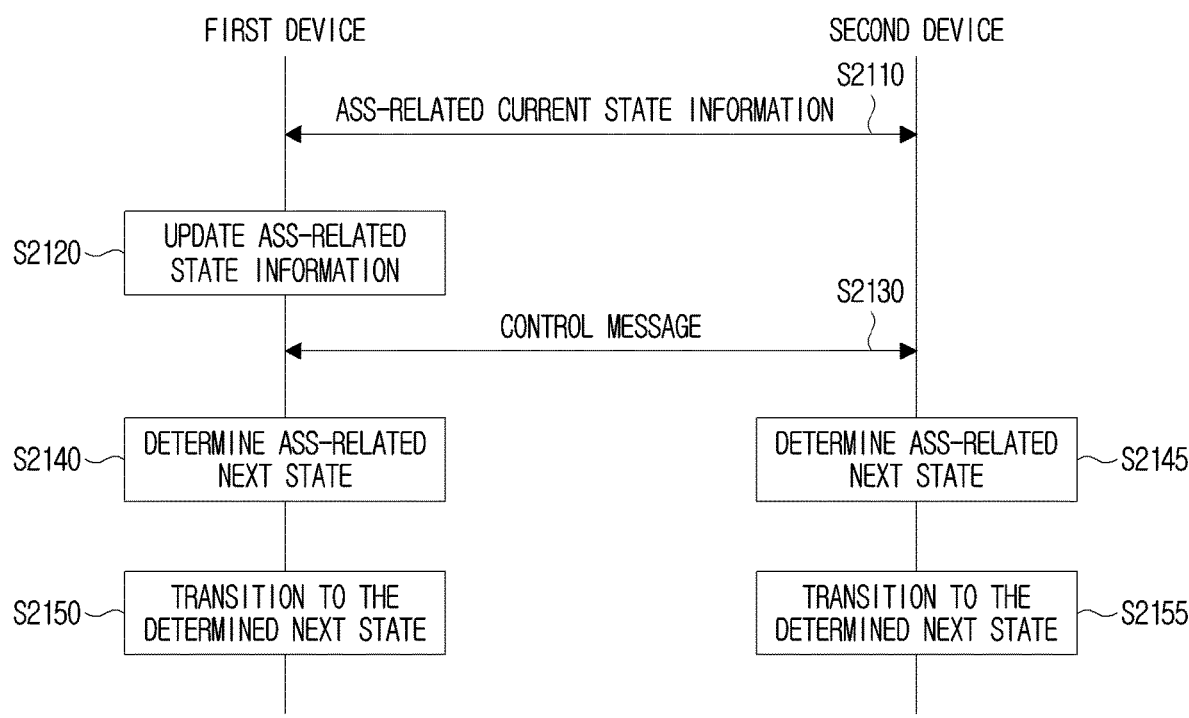
FIG. 21 is a diagram for describing an operation of changing a device state to which the present disclosure is applicable.

FIG. 21 is a diagram for describing an operation of changing a state of a device to which the present disclosure is applicable.

In step S2110, the first device may receive ASS-related current state information of the second device from the second device. In addition, the first device may transmit or share the ASS-related current state information of the first device by a request from the second device or without a request from the second device.

The ASS-related state information may be determined by a state machine for each of ASS endpoints or each of at least one device related to the ASS. For example, the ASS-related state information may correspond to one of idle, codec configured, QoS configured, enabling, streaming, disabling, or releasing.

In addition, the ASS-related state information may be managed for each audio processing condition. For example, the ASS-related state information may be generated, updated, and managed in association with a specific audio processing condition.

In addition, at least one audio processing condition may be preconfigured. For example, for the same one profile or the same one service, the at least one audio processing condition may be defined.

In addition, each of the at least one audio processing condition may be defined in relation to an operation state or an operation environment of a device. For example, the audio processing condition may correspond to a set of parameters related to audio processing of the device. The first audio processing condition may correspond to the first parameter set and the second audio processing condition may correspond to the second parameter set.

The ASS-related current state and next state, which will be described below, may be determined in association with a specific audio processing condition. For example, in examples related to a call control service or a media control service, the first or second device may perform ASS setup based on a specific parameter set (e.g., capability). Accordingly, the ASS-related state information in the first parameter set (or the first audio processing condition) and the ASS-related state information in the second parameter set (or the second processing condition) may be generated, updated, or managed separately.

In step S2120, the first device may update the ASS-related state information. The first device may maintain and manage the ASS-related state information. The first device may update the state information for each ASS-related device (or ASS end) either by itself or at the request of the second device.

In step S2130, the first device and the second device may exchange an ASS-related control message. Such a control message may be a message related to an ASS-related state transition of the first device and/or the second device. For example, the control message may include information for triggering, indicating, requesting, or deriving the change in the ASS-related state of the first device and/or the second device. For example, the control message may be a content control message. For example, the control message may include information related to an audio context, an application, and the like. That is, the control message may include a command, an indication, an indication, a request, a response, a confirmation message, etc. related to an operation performed by the first device and/or the second device.

In step S2140 and step S2145, each of the first device and the second device may determine its ASS-related next state based at least on one of its own ASS-related current state information, the counterpart's current state information, and a control message. For example, even with the same control message, when the current state of a device is an enabling state, the ASS-related next state of the device may be determined as the audio streaming state, and when the current state of a device is a disabling state, the ASS-related next state of the device may be determined as the QoS configured state.

In steps S2150 and S2155, each of the first device and the second device may perform a state transition according to the next state determined in step S2140 and step S2145.

Accordingly, the first and second devices performing the ASS-related operation may perform a more accurate and efficient state transition by identifying the state of the counterpart before performing the state transition.

An example of the present disclosure for an audio stream setup procedure as an example of an ASS-related operation will be described below.

The audio stream setup procedure between the first device and the second device may include a plurality of steps, and the state of the corresponding device may be changed according to the performance of each step.

For example, the audio setup procedure may include the first and second step, the device may transition from the first state to the second state as a result of performing the first step, and may transition from the second state to the third state as a result of performing the second step. Alternatively, the device may transition from the third state to the second state as a result of performing the third step, and may transition from the second state to the first state as a result of performing the fourth step.

That is, the steps of the audio setup procedure and the state of the device may have a correlation or mapping relationship.

Accordingly, when a device is in a specific state, it is possible to identify which steps have already been completed for the device in the audio setup procedure or which steps are required in the future.

The number of steps or the number of states of the audio setup procedure and the correlation/mapping relationship in the above example are exemplary and do not limit the scope of the present disclosure.

For example, the audio setup procedure may include a capability (e.g., ASC) discovery or update step, an audio stream session (ASS) configuration step, ASS enable or establishment step.

In addition, the audio setup procedure may further include an ASS disable step, an ASS release step, and an ASS-related content reallocation step.

For example, the state of the device related to the audio setup may include an AUDIO STANDBY state, an AUDIO CONFIGURED state, an AUDIO STREAMING state.

For example, the device may transition to the AUDIO STANDBY state by performing the ASC discovery step. That is, it may be estimated that the device in the AUDIO STANDBY state has completed the ASC discovery step, and the ASS CONFIGURATION step and an ASS ENABLEMENT step are additionally required for audio streaming.

For example, the device may transition to the AUDIO CONFIGURED state by performing the ASS CONFIGURATION state. That is, it may be estimated that the device in the AUDIO CONFIGURED state has completed the ASC discovery and the ASS CONFIGURATION steps, and the ASS ENABLEMENT step are additionally required for audio streaming.

For example, the device may transition to the AUDIO STREAMING state by performing the ASS ENABLEMENT state. That is, it may be estimated that the device in the AUDIO STREAMING state has completed the ASS CONFIGURATION and the ASS ENABLEMENT steps.

If all steps (i.e., ASC discovery, ASS CONFIGURATION AND ASS ENABLEMENT steps) are repeatedly performed whenever an audio or ASS setup procedure is needed, a decrease in usability such as an increase in latency may occur due to this.

In particular, repeatedly performing all steps of ASS setup without considering the state of the device may cause a problem of performing unnecessary steps. For example, performing the ASC discovery step for a device in the AUDIO CONFIGURED state may cause unnecessary resource consumption.

Accordingly, it is required to determine whether to perform the detailed steps of ASS setup in consideration of the state of the device.

If the audio stream setup or the procedure of audio stream session setup is repeated every time, there is a problem in that usability deteriorates. According to the present disclosure, it is possible to solve this problem by enabling the procedure of one stream setup or audio stream session setup consisting of multiple steps to start from the intermediate step of the multi-step based on the current state.

To this end, two devices that want to perform the ASS setup procedure may determine each other's state in advance and perform only necessary steps accordingly. For example, in the step of starting AUDIO STREAMING, the mutual state (e.g., AUDIO STANDBY, AUDIO CONFIGURED, AUDIO STREAMING) may be checked.

Alternatively, the state of procedure performed by the client may be managed for each server. The client may manage it without the need to check the state between the client and the server.

Alternatively, the server may manage the performed procedure state for each client. The server may manage it without the need to check the state between the client and the server.

For example, the first device and the second device may exchange information indicating respective ASS setup-related states (e.g., AUDIO STANDBY, AUDIO CONFIGURED, AUDIO STREAMING).

The first device may maintain and manage information indicating the progress of ASS setup (e.g., a completed step among ASC DISCOVERY, ASS CONFIGURATION, and ASS ENABLEMENT) for each of at least one second device.

Alternatively, the first device may maintain and manage information indicating the ASS setup related state (e.g., AUDIO STANDBY, AUDIO CONFIGURED, AUDIO STREAMING) for each of at least one second device.

Here, a mapping relationship between a completed step in ASS setup and a state related to ASS setup may be preconfigured.

For example, history information indicating a completed step in ASS setup or ASS setup-related state information may be mapped to each other. In addition, ASS setup-related history information may be explicitly exchanged, maintained, or managed, and ASS setup-related state information may be implicitly determined from the ASS setup-related history information. Alternatively, ASS setup-related state information may be explicitly exchanged, maintained, or managed, and ASS setup-related history information may be implicitly determined from the ASS setup-related state information.

Accordingly, the first device may determine a necessary step to complete the ASS setup with the second device and may perform a subsequent procedure accordingly.

Here, the first device may be a peripheral device of the second device. Likewise, the second device may be a peripheral device of the first device. For example, the first device may be a server and the second device may be a client. Alternatively, the first device may be a client and the second device may be a server.

Figure 22:
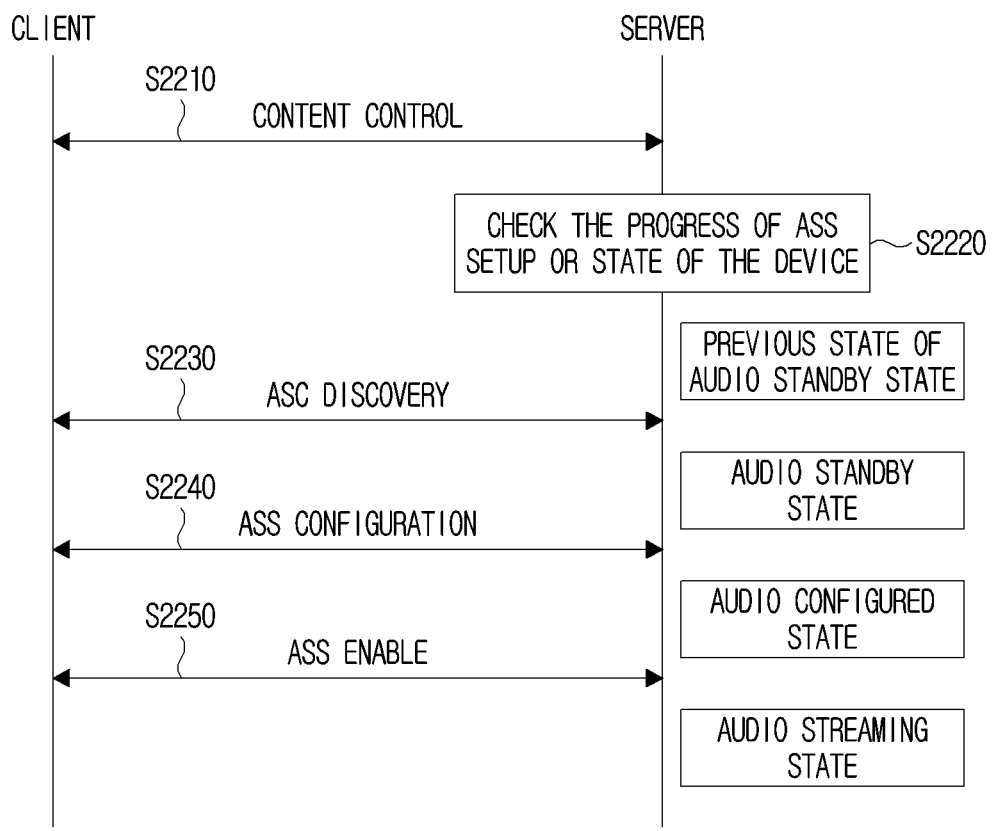
FIG. 22 to FIG. 31 are flow charts for describing examples of a method for managing state change of peripheral devices to which the present disclosure is applicable.

FIG. 22 is flow chart for describing an example of a method for managing state change of peripheral devices to which the present disclosure is applicable.

In step S2210, the client and the server may perform a content control step. The content control may include exchanging a content control message.

In step S2220, the client and the server may check the progress of the ASS setup procedure or the state of the counterpart device. For example, the server may determine which of the first step (e.g., ASC discovery), the second step (e.g., ASS configuration), and third step (e.g., ASS enable) of the ASS setup procedure with the client has been completed, and what the current state of its own and the current state of the counterpart device. For example, it may determine whether the ASS setup-related state of the server and/or the client itself and/or the counterpart is in a previous state of AUDIO STANDBY state, AUDIO STANDBY state, AUDIO CONFIGURED state, or AUDIO STREAMING state. Accordingly, the server and the client may determine which steps are required to be performed subsequently during the ASS setup procedure.

If the current states of the server and the client are the previous state of AUDIO STANDBY state, the ASC discovery step may be performed in step S2230.

If the current states of the server and the client are AUTO STANDBY state, the ASS configuration step may be performed in step S2240.

If the current states of the server and the client are AUDIO CONFIGURED state, the ASC enable state may be performed in step S2240.

In the example of FIG. 22, the previous state of AUDIO STANDBY state is a state in which device discovery is not performed, and when a device discovery result is derived, it may transition to the AUDIO STANDBY state by performing ASC discovery.

For example, when the state of the client is the AUDIO CONFIGURED state, the server may directly perform the ASS enable step without performing the ASC discovery and ASS setting steps with the client.

Although the example of FIG. 22 describes a method initiated by the server, the present disclosure is not limited hereto, and the client may initiate and manage the ASS setup progress and/or ASS setup-related state of a peripheral device (e.g., a server).

In addition, in the state change management operation of the peripheral device of the present disclosure, the client may correspond to an audio stream management profile (ASMP) client, and the server may correspond to an ASMP server. The ASMP client and the server may exchange information on the progress of ASS setup and/or ASS setup related state. Alternatively, the ASMP client may manage ASS setup progress and/or ASS setup related state for each ASMP server. Alternatively, the ASMP server may manage ASS setup progress and/or ASS setup related status for each ASMP client.

Although the following examples mainly describes an example in which the server maintains the state of the server and the client (or the ASS end), and the server informs or shares the state change of the server and/or the client (or the Ass end) to the client, the scope of the present disclosure is not limited thereto. The present disclosure may include examples in which the client informs the server of the client's state change, the server and the client inform each other of their respective state changes, the subject that maintains and manages the state change is the client, or the subject that maintains and manages the state change is the server.

Figure 23:
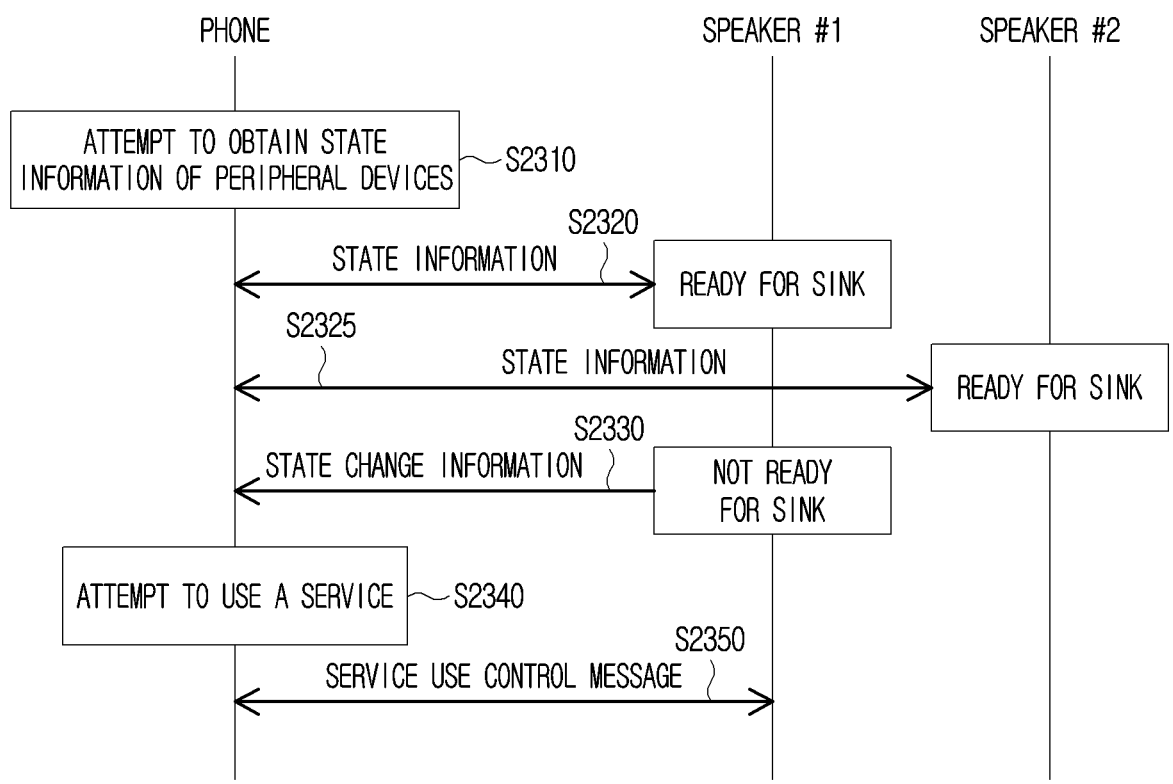

FIG. 23 is a flow chart for describing an additional example of a method of managing a state change of a peripheral device to which the present disclosure is applicable.

In this example, a phone may correspond to an ASMP client or media control server, and speaker #1 and speaker #2 may correspond to an ASMP server or a media control client.

In step S2310, the phone may attempt to obtain state information of peripheral devices. For example, when a user of the phone decides to use the audio service, state information of the peripheral devices may be obtained according to the user's intention to determine the state of the peripheral devices.

In step S2320, the phone may obtain the current state information of the speaker #1. For example, the current state of the speaker #1 may be shared at the request of the phone or without the request of the phone. For example, it is assumed that the speaker #1 is in a ready state as an audio sink device by performing an operation such as ASC discovery and the like. In step S2325, similar to step S2320, the phone may obtain the current state information of the speaker #2. In addition, in steps S2320 and/or S2325, the speaker #1 and/or #2 may acquire information on the current state of the phone.

For example, the phone and the speaker may exchange a message to determine their mutual state (i.e., obtain state information). Such a message may include information indicating a state of each device. Such a message may be requested or transmitted when a predetermined condition is satisfied (e.g., when the state of the device is changed). In addition, such a message may be advertised when certain events occur or in a periodic manner.

In step S2330, state change information of speaker #1 may be transmitted to the phone. For example, the phone and speakers may be in a ready state, and then, the speaker #1 may be changed to a not ready state for reasons such as entering a power save mode. In this case, the speaker #1 may inform the phone state change information. Alternatively, while the current state information of the speaker #1 is transmitted in a periodic manner, the phone may obtain the state change information of the speaker #1.

In step S2340, the phone may attempt to use a service. For example. when the user of the phone decides to use an audio service, an audio streaming operation with a speaker may be attempted according to the user's intention to use the audio service.

In step S2350, the phone may exchange a service use control message with the speaker #1. That is, since the phone and speaker #1 have already acquired the current state information from each other, when starting the audio service-related operation by the control message, only the operation necessary for the audio service may be performed based on the current state and the control message.

For example, since the phone has performed the procedure of exchanging information with the speaker #1 until it reaches the ready state (e.g., AUDIO STANDBY), when attempting to stream audio data through the speaker #1 later, it may not be necessary to perform a procedure such as ASC discovery that was previously performed again.

That is, when attempting to use the service (e.g., start or restart audio data streaming) through the speaker #1 according to the user's intention to use the service, time and radio resources may be saved by performing only the message exchange necessary for ASS setup and ASS enable procedures, without having to perform procedures such as ASC discovery from the beginning again.

Figure 24:
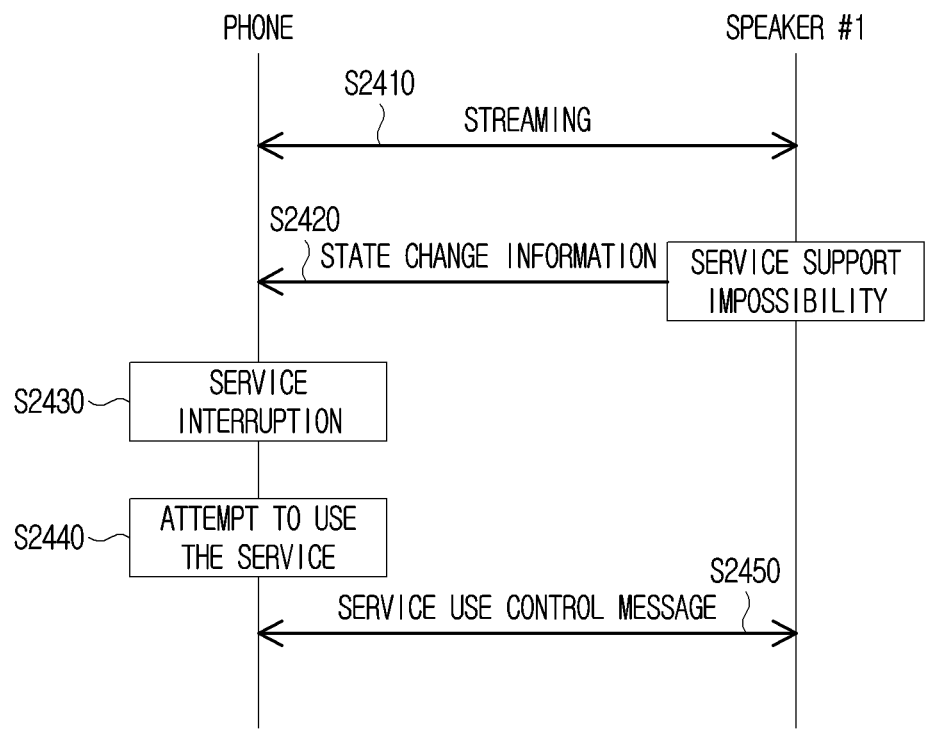

FIG. 24 is a flow chart for describing additional example of a method for managing a state change of a peripheral device to which the present disclosure is applicable.

In an example of the FIG. 24, the phone may correspond to an ASMP client or media control server, and the speaker #1 may correspond to an ASMP server or a media control client.

In step s2410, the phone and the speaker #1 may perform audio data streaming. This may mean that the phone and the speaker are in the AUDIO STREAMING state after performing ASS setup procedure.

In step S2420, state change information of speaker #1 may be transmitted to the phone. For example, when the phone and the speaker #1 are in the AUDIO STREAMING state and the speaker #1 is expected to change to the service unsupportable state, state change information may be notified to the phone.

In step S2430, the phone may perform a service interruption operation. For example, the phone may stop streaming audio and transition to an enabling, disabling, or canceling state based on a notification of a change in the service support unavailable state of the speaker #1, resulting in a user service unavailable state.

In step S2440, the phone may attempt to use the service. For example, when the user of the phone decides to use an audio service, an audio streaming operation with a speaker may be attempted according to the user's intention to user the audio service.

In step S2450, the phone may exchange a service use control message with the speaker #1. The service use control message may be a content control message. That is, since the phone and the speaker #1 have already obtained the current state information from each other, when starting the audio service-related operation by the control message, only the operation necessary for the audio service may be performed based on the current state and control message.

For example, when attempting to use the service again in step S2440, since there is a history of exchanging necessary information with the speaker #1 through the ASC discovery and ASS configuration steps of the ASS setup procedure before the phone and the speaker #1 transition to the streaming state in step S2410, the phone may resume service again by omitting steps such as speaker #1 and ASC discovery and ASS configuration and performing only necessary procedures such as ASS enable.

In relation to the above-described examples, when a protocol for notifying the first device of the state change of the second device is not provided, even if there is a history of audio streaming between the first and second devices, after the service interruption, there was a problem in that the ASS setup procedure between the first and second devices had to be restarted from the beginning (e.g., from the scanning or discovery phase). However, when the information exchanged through the previously performed procedure may be used again by sharing and managing the mutual state change between the first and second devices, the previously performed procedure may be omitted and only necessary procedures may be performed.

Figure 25:
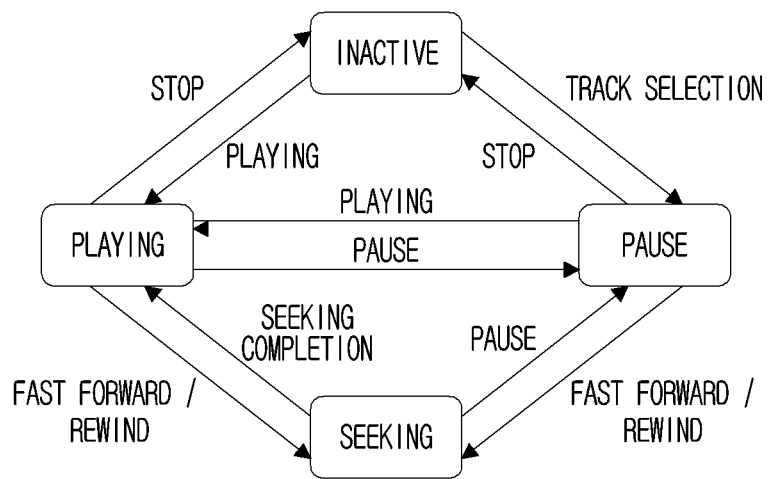

FIG. 25 is a diagram exemplarily illustrating a media control service state machine to which the present disclosure is applicable.

The media control may include an inactive, playing, paused, seeking state. The transition may be performed from the inactive or paused state to the playing state according to a play command, and may also transition to the playing state when the seeking is completed. The inactive state may correspond to a state when a stop command is generated in the playing or paused state. The seeking state corresponds to a state in which fast forward or rewind is executed in the playing or paused state. When a stop command is generated in the playing or seeking state, or when a track selection command is generated in the inactive state, the pausing state may be transitioned.

Figure 26:
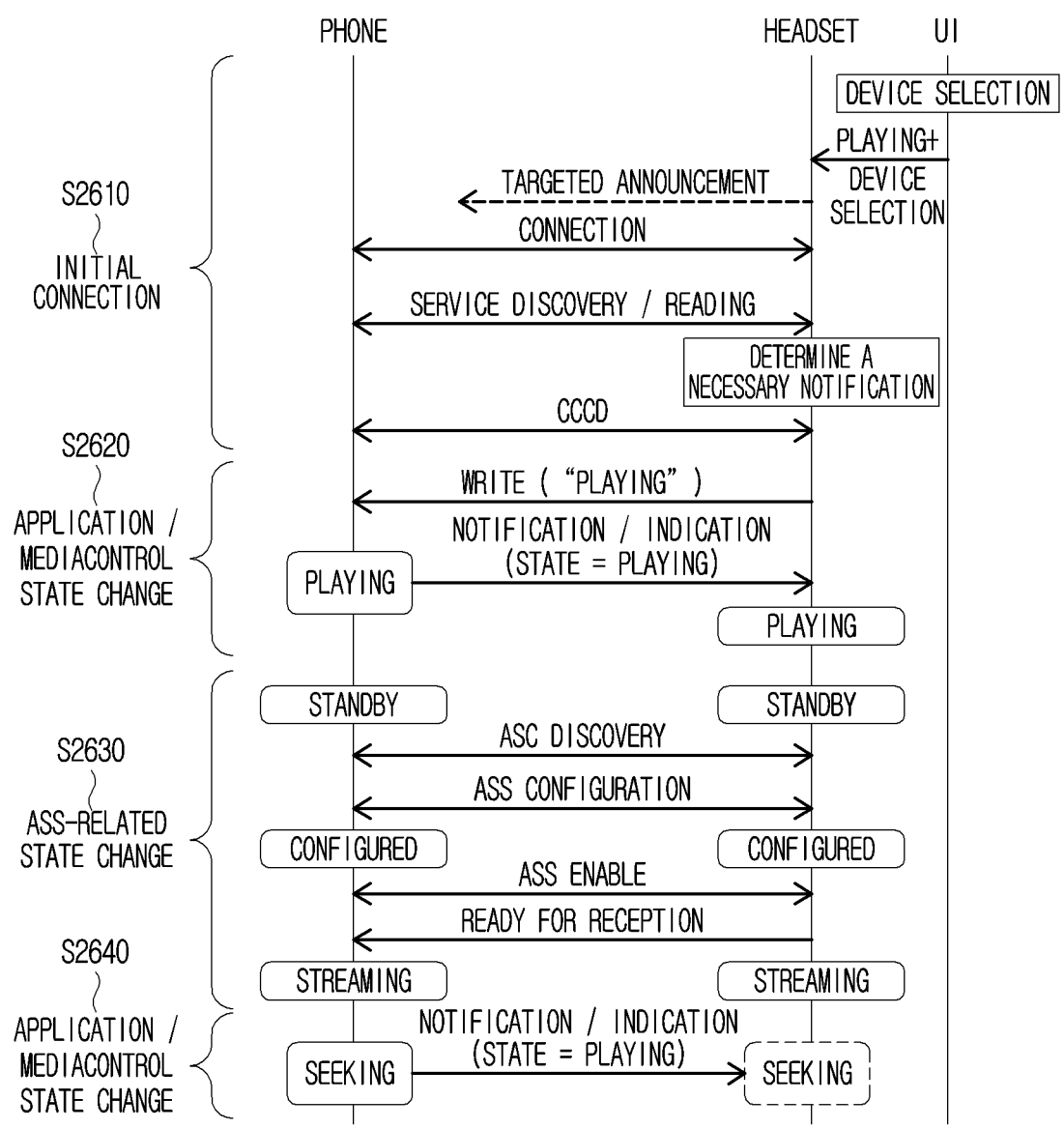
Figure 27:
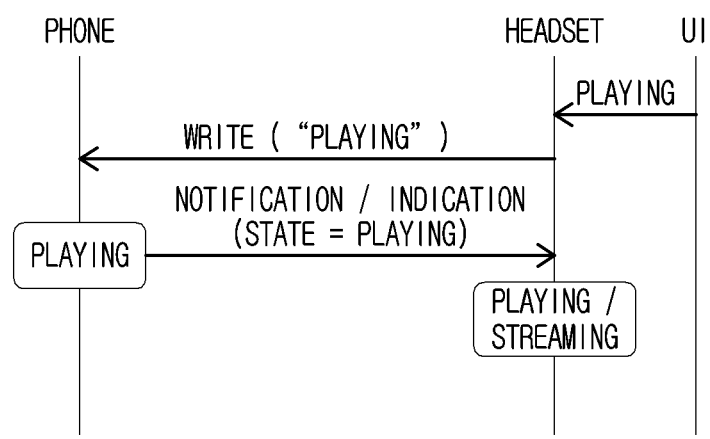

FIG. 26 and FIG. 27 are flow charts for describing an additional example of a method for managing a state change of a peripheral device to which the present disclosure is applicable.

In the example of FIG. 26 and FIG. 27, the phone corresponds to an ASMP client or media control server, and the headset corresponds to an ASMP server or media control client.

In an initial connection operation of S2160, device selection and play command input may occur through the user interface (UI) of the headset. For example, one button of the headset UI may be assigned a play/stop toggle function, and a device selection and play command may be input by the user operating the corresponding button. Accordingly, a targeted announcement message may be transmitted. Based on this, the phone and the headset may establish a mutual connection. The connection between the phone and the headset may include an Asynchronous Connection-Less (ACL), an L2CAP Connection Oriented Channel (CoC), and a GATT connection. In addition, service discovery and/or reading of service-related features may be performed for the media control service (MCS). Accordingly, the headset may establish an initial connection through a process such as determining a necessary notification and exchanging a CCCD (Client Characteristic Configuration Descriptor) such as registering an MCS notification.

In step S2620, an application or media control change state may be performed. For example, the application may only manage the playing state and pausing state. For example, a playing command may be transmitted from the headset to the phone through a write request message and the like. Accordingly, the application or media control state of the phone may transition to the play state, and a notification or indication message including such state change (i.e., state=play) information may be transmitted from the phone to the headset. Accordingly, the application or media control state of the headset may transition to the play state, and the ASS-related state may transition to the AUDIO STANDBY state.

In step S2630, the ASS state change procedure may be performed. For example, the phone and the headset may transition from the AUDIO STANDBY state to the AUDIO CONFIGURED state through the ASC discovery, ASS configuration (codec configuration, QoS configuration) steps. After that, when the ASS enable step is performed and the phone is informed that the headset is ready for reception, the AUDIO STREAMING state may be transitioned. In the AUDIO STREAMING state, audio data transmitted from the phone to the headset may be rendered in the headset.

In step S2640, when a seeking operation through the UI occurs during audio data streaming or playing, a seeking command may be transmitted to the phone through a write request message, and accordingly, a notification/instruction message may be transmitted from the phone to the headset. Here, assuming that only the playing and pause states may be managed in the application, the application may ignore the seeking state and enter the playing state or the pause state. Meanwhile, the media control may be in a seeking state.

As described above, if there is a history of audio streaming by establishing an interconnection between the phone and the headset and completing the ASS setup, the previously performed procedure may not be repeated when streaming between the phone and the headset is attempted again later.

As in the example of FIG. 27, when a playing command is input through the UI of the headset, it may be transmitted to the phone through a write request message.

Here, the phone and headset do not need to perform the initial connection procedure such as connection, service discovery, CCCD exchange and the like, and an application or media control of the phone may immediately transition to the playing state.

In addition, when the playing state is notified/indicated from the phone to the headset, the state machine for the headset's application or media control may transition to the playing state.

Here, since there is a history in which the phone and the headset have completed the ASS setup procedure, the state machine that manages the ASS-related state (or middleware state) may transition to STREAMING without the need to perform steps such as ASC discovery, ASS configuration, ASS enable. That is, unlike the transition to the STANDBY state according to the play notification in the example of FIG. 26, the transition to the STREAMING state may be performed in the example of FIG. 27.

Figure 28:
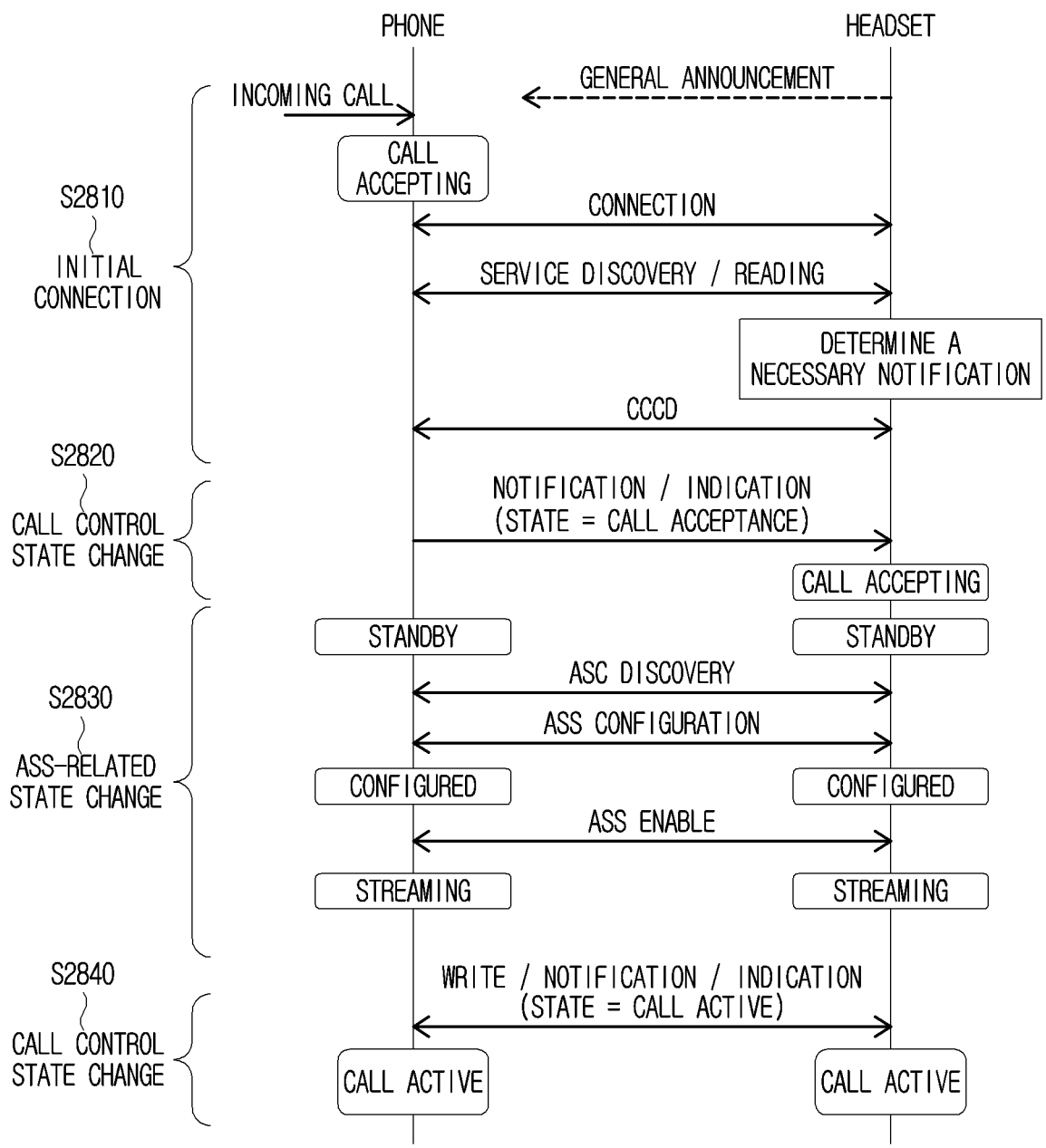
Figure 29:
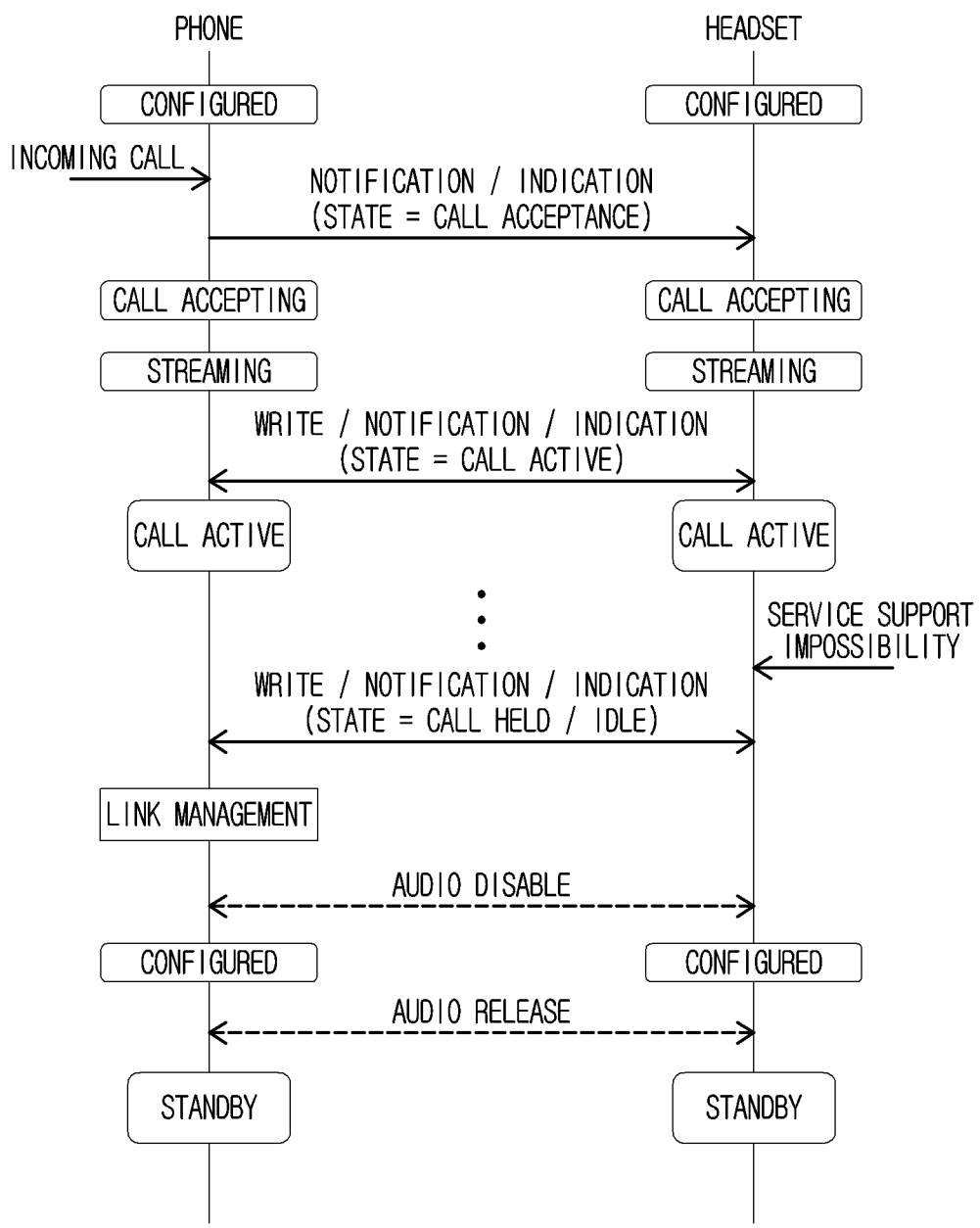

FIG. 28 and FIG. 29 are flow charts for describing an additional example of a method for managing a state change of a peripheral device to which the present disclosure is applicable.

In examples of FIG. 28 and FIG. 29, a phone may correspond to an ASMP client or a call control server, and a server may correspond to an ASMP server or a call control client.

In initial connection operation of step S2810, when a call is received on the phone, the state machine of the call control service of the phone may transition to the CALL ACCEPTING state. In addition, the headset may transmit general announcement. Based on this, the phone and the headset may establish an interconnection. The connection between the phone and the headset may include ACL, L2CAP CoC, GATT connection. In addition, service discovery and/or reading of service related features may be performed for a call control service (CCS). Accordingly, the headset may establish an initial connection through processes such as determining a necessary notification and exchanging CCCDs such as registering a CCS notification.

In step S2820, the call control state change may be performed. For example, the call control state of the phone transitions to the call acceptance state, and a notification or instruction message including such state change (i.e., state=call accepted) information may be transmitted from the phone to the headset. Accordingly, the call control state of the headset may transition to the call acceptance state, and the ASS-related state of the phone and the headset may transition to the AUDIO STANDBY state.

In step S2830, the ASS state change procedure may be performed. For example, the phone and the headset may transition from the AUDIO STANDBY state to the AUDIO CONFIGURED state through ASC discovery, ASS configuration (codec configuration, QoS configuration). Here, the ASMP state machine may be an idle state and the call control service state machine may be a call alerting state. After that, it may transition to the AUDIO STREAMING state by performing the ASS enable step. In the AUDIO STREAMING state, audio data transmitted form the phone to the headset may be rendered in the headset In step S2840, state change (that is, state=call active) information may be transmitted through a write, notification, indication. Accordingly, the call control state may transition to the call active state in the phone and the headset.

As described above, if there is a history of performing audio streaming by establishing an interconnection between the phone and the headset and completing the ASS setup, the previously performed procedure may not be repeated when streaming between the phone and the headset is attempted again later.

As in the example of FIG. 29, when an incoming call is issued to the phone while the phone and the headset are in the AUDIO CONFIGURED state, the call control state of the phone may transition to the call acceptance state, and a notification or indication message including this state change (i.e., state=call acceptance) information may be transmitted from the phone to the headset. Accordingly, the call control state of the headset may transition to the call acceptance state, and the ASS-related state between the phone and the headset may transition to the AUDIO STREAMING state.

That is, unlike the phone and the headset performing the ASS setup procedure in the AUDIO STANDBY state after the incoming call occurs in the example of FIG. 28, since an incoming call has occurred in the AUDIO CONFIGURED state between the phone and the headset in the example of FIG. 29, it may immediately transition to the AUDIO STREAMING state.

In addition, in the AUDIO STREAMING state, the state change (i.e., state=call active) information may be transmitted to the phone and the headset through a writing, notification, or indication message. Accordingly, the call control state may transition to the call active state in the phone and the headset.

Meanwhile, in a call active state, a service support impossibility state of the headset may occur during a call service. For example, the service support impossibility state may include a case in which the distance between the phone and the headset increases (Range Out), and the call service is paused (Paused) or terminated (Terminate).

In this case, the phone and the headset may inform the state change through a write, notification, and indication message. For example, when a call service stop occurs in the phone or headset, the call service state machine may transition to a call held state and may notify the counterpart device of this. When termination occurs in the phone or headset, the call service state machine may transition to an idle state, and may notify the counterpart device of this.

Accordingly, a management operation for the corresponding link may be performed. Link management may include determining to maintain or release a link related to identification information of the corresponding activity or service in consideration of multiple activities or services. For example, the phone and the headset may transition from the AUDIO STREAMING state to the AUDIO CONFIGURED state through the audio disable procedure, and may transition to the AUDIO STANDBY state through the audio release procedure.

On the other hand, in the case of out of range out, the headset and the phone may not be able to transmit/receive a write/notification/indication message for notifying the mutual state change. When out of range with the counterpart is confirmed, the phone and the headset may transition to the AUDIO STANDBY state through the audio disabling and audio release steps. If the phone and the headset enter the communication range again, the AUDIO STREAMING state may be returned directly without performing the ASC discovery, ASS setting, and ASS enable steps again, based on the previous ASS setup performance history.

Figure 30:
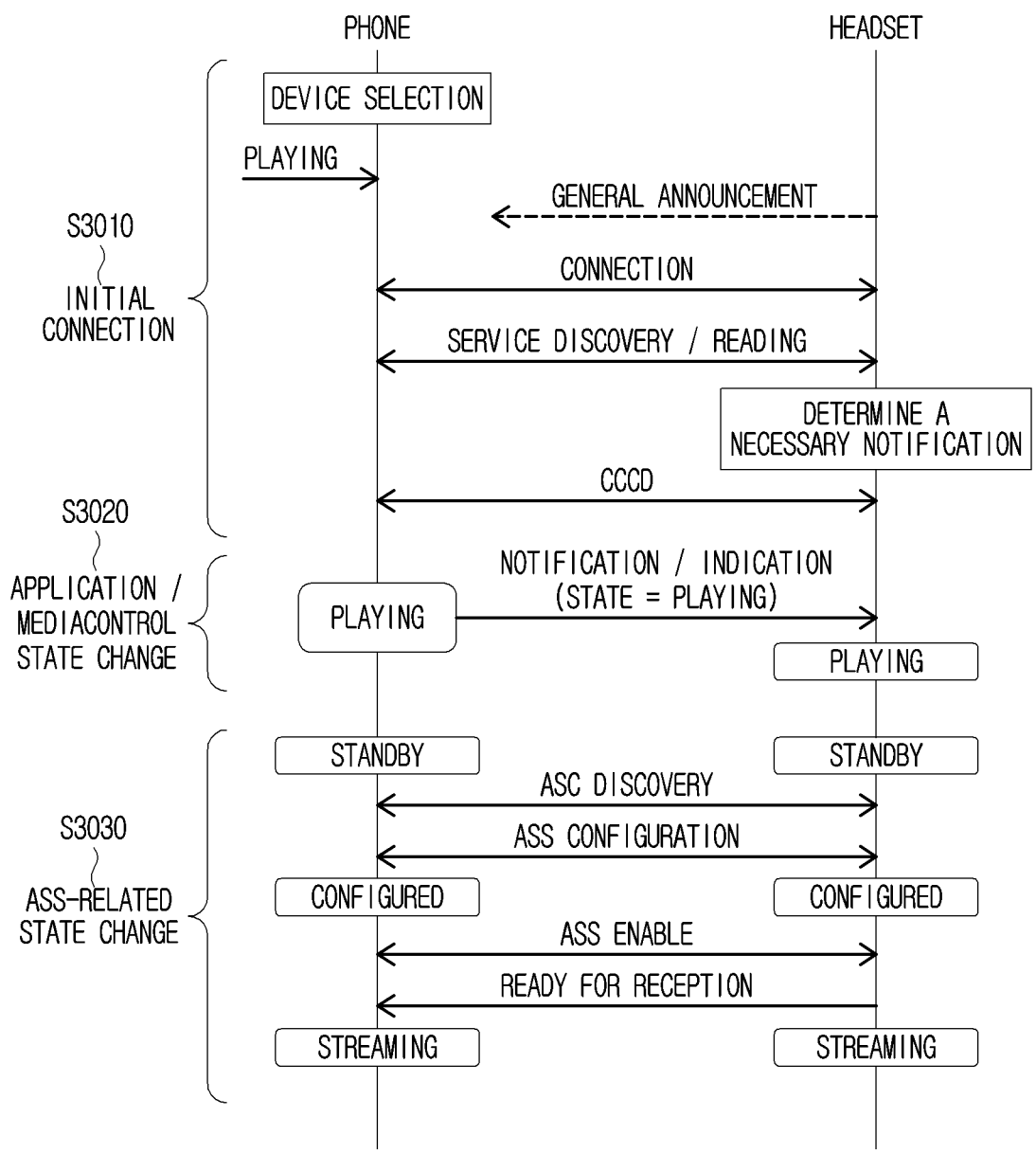
Figure 31:
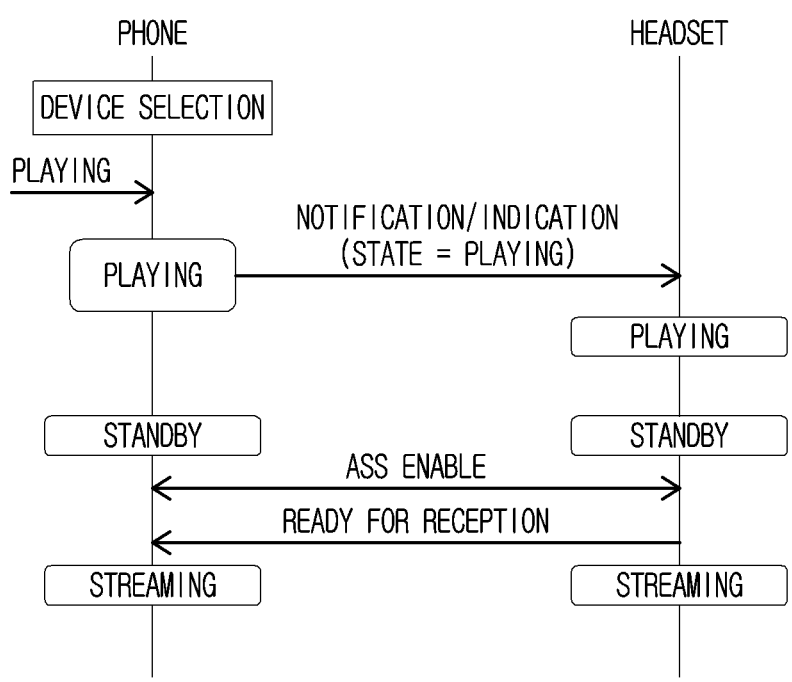

FIG. 30 and FIG. 31 may e a flow chart for describing an additional example of a method for managing a state change of a peripheral device to which the present disclosure is applicable.

In examples of FIG. 30 and FIG. 31, the phone may correspond to an ASMP client or a media control server, and the headset may correspond to an ASMP server and a media control client.

The example of FIG. 30 exemplarily illustrates a case where a device selection and a playing command input are generated from the phone, unlike the case where the device selection and playing command input are generated through the user UI of the headset in FIG. 26.

In step S3010 of an initial connection operation, when the device selection and playing command input may occur in the phone, an activity or service identifier may be determined in the phone and/or headset. In addition, the headset may transmit a general announcement. Based on this, the phone may establish an interconnection with the headset. The connection between the phone and the headset may include an ACL, L2CAP CoC, GATT connection. In addition, service discovery and/or reading of service related features may be performed for a call control service (CCS). Accordingly, the headset may establish an initial connection through a process such as determining a necessary notification and exchanging a CCCD such as registering a CCS notification.

In step S3020, an application or media control state change may be performed. For example, the application or media control state of the phone may transition to the playing state, and a notification or indication message including this state change (i.e., state=playing) information may be delivered from the phone to the headset. Accordingly, the application or media control state of the headset may transition to the playing state. Also, an audio stream session identifier (e.g., ASS ID) for an audio stream in the phone and/or headset may be determined, and the ASS-related state may transition to an AUDIO STANDBY state.

In step S2630, the ASS state change procedure may be performed. For example, the phone and the headset may transition from the AUDIO STANDBY state to the AUDIO CONFIGURED state through the ASC discovery, ASS configuration (codec configuration, QoS configuration) steps. If the activity or service identifier is not determined in the initial connection step, the activity or service identifier may be determined in the phone and/or headset in the ASS setting stage. After that, when the ASS enable step is performed and the phone is informed that the headset is ready for reception, the AUDIO STREAMING state may be transitioned. In the AUDIO STREAMING state, audio data transmitted from the phone to the headset may be rendered in the headset.

As described above, if there is a history of performing audio streaming by establishing an interconnection between the phone and the headset and completing the ASS setup, the previously performed procedure may not be repeated when streaming between the phone and the headset is attempted again later.

As in the example of FIG. 31, when the device selection and playing command input occur in the phone, an activity and service identifier may be determined in the phone and/or the headset.

Here, the application or media control of the phone may immediately transition to the playing state without the need for the phone and the headset to perform an initial connection procedure such as connection, service discovery, and CCCD exchange. A notification or indication message including such state change (i.e., state=playing) information may be transmitted from the phone to the headset. Accordingly, the application or media control state of the headset may transition to the playing state. Also, an audio stream session identifier (e.g., ASS ID) for an audio stream in the phone and/or headset may be determined, and the ASS-related state may transition to an AUDIO STANDBY state.

Here, since there is a history in which the phone and the headset have completed the ASS setup procedure, there is no need to perform the ASC discovery, ASS configuration steps. If the activity or service identifier is not determined in the initial connection step, the activity or service identifier may be determined in the phone and/or headset in this step. After that, when the ASS enable step is performed and the phone is informed that the headset is ready for reception, the AUDIO STREAMING state may be transitioned. In the AUDIO STREAMING state, audio data transmitted from the phone to the headset may be rendered in the headset.

That is, unlike the transition to the STANDBY, CONFIGURED, and STREAMING states according to the play notification in the example of FIG. 30, it may transition directly from the STANDBY state to the STREAMING state in the example of FIG. 31.

As in the above examples, according to the present disclosure, the server and the client may exchange information indicating each other's state or history related to ASS setup, the server may maintain or manage information on the ASS setup state or history of each of one or more clients, or the client may maintain or manage information on the ASS setup state history of each of one or more servers.

Accordingly, in two devices that want to perform audio streaming through ASS setup, one device may omit the procedure or step of the previously performed ASS setup and perform only necessary step or procedure based on information on the ASS setup state or history with the other device.

More specifically, in the examples of the present disclosure, the server and the client may obtain the current state information of the other party prior to the state transition, and determine the next state to be transitioned based on this. That is, if the server and the client cannot acquire the current state information of the counterpart, they may determine the next state to be transitioned to based only on their own state and control message. In this case, since the current state of the counterpart cannot be used, inefficiencies such as unnecessary operation being performed or an operation different from the intended operation being performed by the counterpart may increase. On the other hand, if the current state information of the counterpart can be obtained, it may accurately and efficiently determine a state to be transitioned to the next based on the own state, the state of the counterpart, and the control message.

Figure 32:
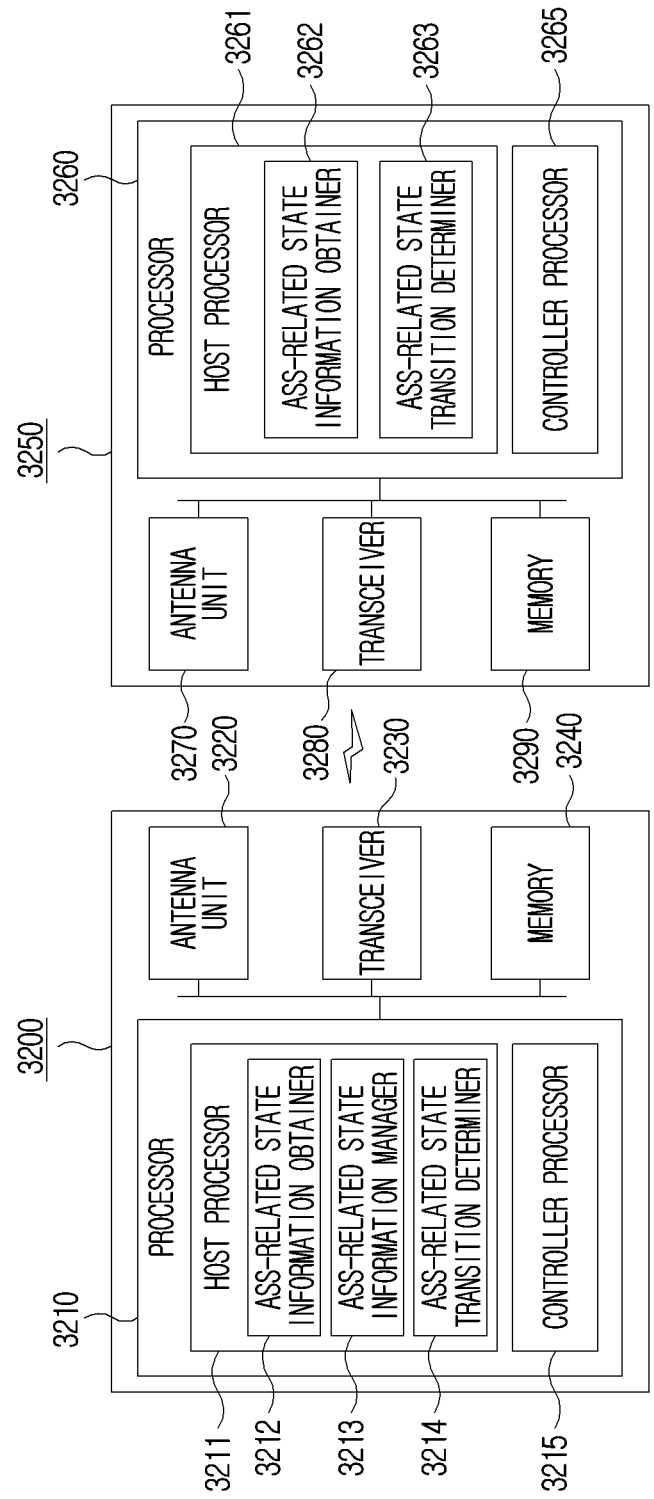
FIG. 32 is a diagram illustrating a configuration of the first device and the second device to which the present disclosure may be applied.

FIG. 32 is a diagram illustrating a configuration of the first device and the second device to which the present disclosure is applicable.

The first device 3200 may include a processor 3210, an antenna unit 3220, a transceiver 3230, and a memory 3240.

The processor 3210 may perform baseband-related signal processing and may include a host processor 3211 and a controller processor 3215. The host processor 3211 and the controller processor 3215 may exchange information through HCl. The host processor 3211 may process operations such as L2CAP, ATT, GATT, GAP, and LE profile layers. The controller processor 3215 may process operations such as LL and PHY layers. The processor 3210 may control the overall operation of the first device 3200 in addition to performing baseband-related signal processing.

Antenna unit 3220 may include one or more physical antennas.

The transceiver 3230 may include RF (Radio Frequency) transmitter and RF receiver. The memory 3240 may store information processed by the processor 3210 and software, an operating system, and an application related to the operation of the first device 3200, and may include components such as a buffer and the like.

The processor 3210 of the first device 3200 may be configured to implement an operation of the first device (or, the server) in the embodiments described in the present disclosure.

For example, the host processor 3211 of the processor 3210 of the first device 3200 may include an ASS-related state information obtainer 3212, an ASS-related state information manager 3213, and an ASS-related state determinator 3214.

The ASS-related state information obtainer 3212 may obtain the current ASS-related state of the first device 3200. In addition, the ASS-related state information obtainer 3212 may obtain the current ASS-related state of the second device 3250.

The ASS-related state information manager 3213 may update, maintain, and manage the ASS-related state for at least one of the first device 3200 or the second device 3250 obtained by the ASS-related state information obtainer 3212.

The ASS-related state transition determiner 3214 may determine an ASS-related state to which the first device 3200 will transition, based at least on current ASS-related state information of the second device 3250. In addition, the ASS-related state transition determiner 3214 may determine an ASS-related state to which the first device 3200 will transition based at least on one of the current ASS-related state information of the first device 3200, the current ASS-related state information of the second device 3250, or information included in the control message. The control message is a message exchanged between the first device 3200 and the second device 3250, and may correspond to a message deriving transition of the ASS-related state between the first device 3200 and the second device 3250.

The processor 3210 may perform a transition to the state determined by the ASS-related state transition determiner 3214.

The second device 3250 may include a processor 3260, an antenna unit 3270, transceiver 3280, and a memory 3290.

The processor 3260 may perform baseband-related signal processing and may include a host processor 3261 and a controller processor 3265. The host processor 3261 and the controller processor 2865 may exchange information through HCl. The host processor 3261 may process operations such as L2CAP, ATT, GATT, GAP, and LE profile layers. The controller processor 3265 may process operations of the LL layer, the PHY layer, and the like. The processor 3260 may control the overall operation of the second device 3260 in addition to performing baseband-related signal processing.

The antenna unit 3270 may include one or more physical antennas. The transceiver 3280 may include an RF transmitter and an RF receiver. The memory 3290 may store information processed by the processor 3260 and software, an operating system, and an application related to the operation of the second device 3250, and may include components such as a buffer and the like.

The processor 3260 of the second terminal device 3250 may be configured to implement the operation of the second device (or client) in the embodiments described in the present disclosure.

For example, the host processor 3261 of the processor 3260 of the second device 3250 may include an ASS-related state information obtainer 3262 and an ASS-related state determinator 3263.

The ASS-related state information obtainer 3262 may obtain the current ASS-related state of the first device 3200. In addition, the ASS-related state information obtainer 3262 may obtain the current ASS-related state of the second device 3250.

The ASS-related state transition determiner 3263 may determine an ASS-related state to which the second device 3250 will transition based at least on current ASS-related state information of the first device 3200. In addition, the ASS-related state transition determiner 3263 may determine an ASS-related state to which the second device 3250 will transition based at least on one of the current ASS-related state information of the first device 3200, the current ASS-related state information of the second device 3250, or information included in the control message. The control message is a message exchanged between the first device 3200 and the second device 3250, and may correspond to a message deriving transition of the ASS-related state between the first device 3200 and the second device 3250.

The processor 3260 may perform a transition to the state determined by the ASS-related state transition determiner 3263.

In the operation of the first device 3200 and the second device 3250, the descriptions of the server and the client in the examples of the present invention may be applied in the same manner, and overlapping descriptions will be omitted.

Various embodiments of the present disclosure may be implemented by hardware, firmware, software, or a combination thereof. For implementation by hardware, various embodiments of the present disclosure may be implemented one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general purpose It may be implemented by a processor (general processor), a controller, a microcontroller, a microprocessor, and the like.

The scope of the present disclosure includes software or machine-executable instructions (e.g., operating system, application, firmware, program, etc.) that cause operation according to the method of various embodiments to be executed on a device or computer, and a non-transitory computer-readable medium in which such software or instructions are stored and executed on a device or computer. Instructions that may be used to program a processing system to perform the features described in this present disclosure may be stored on/in a storage medium or computer-readable storage medium, and features described in the present disclosure may be implemented using a computer program product including such the storage medium. The storage medium may include, but is not limited to, a high-speed random access memory such as DRAM, SRAM, DDR RAM or other random access solid state memory device, one or more magnetic disk storage devices, optical disk storage devices, flash memory devices, or may include non-volatile memory such as other non-volatile solid state storage devices. The memory optionally includes one or more storage devices located remotely from the processor (s). The memory or alternatively the non-volatile memory device(s) within the memory includes a non-transitory computer-readable storage medium. Features described in this present disclosure may be stored on any one of the machine readable media to control hardware of the processing system, and it may be incorporated into software and/or firmware that allows the processing system to interact with other mechanisms that utilize results in accordance with embodiments of the present disclosure. Such software or firmware may include, but is not limited to, application codes, device drivers, operating systems, and execution environments/ containers.

INDUSTRIAL APPLICABILITY

Embodiments of the present disclosure may be applied to various wireless communication systems to increase the performance of the wireless communication system.

The invention claimed is:

1. A method for changing an audio stream session-related state, the method comprising:
   receiving, by a server in a source device from a client in a sink device, an initiating message based on a current audio stream session-related state of the client in the sink device before the server in the source device in a first audio stream session-related state performs an audio stream session-related state transition;
   determining, by the server in the source device, a second audio stream session-related state of the server in the source device based on the initiating message, without stopping an operation in the first audio stream session-related state; and
   performing, by the server in the source device, the audio stream session-related state transition based on the second audio stream session-related state,
   wherein an audio stream session-related state is maintained by the server in the source device and is shared with the client in the sink device using at least one characteristic.

2. The method of claim 1, wherein:
   the audio stream session-related state transition of the server in the source device is initiated by the initiating message from the client in the sink device, and
   the initiating message is a write message for the at least one characteristic.

3. The method of claim 2, wherein:
   the second audio stream session-related state is determined based at least on one of the first audio stream session-related state of the server in the source device, information included in the initiating message, or an audio processing condition of the server in the source device.

4. The method of claim 1, wherein:
   the audio stream session-related state includes at least one of idle, codec configured, quality of service (QoS) configured, enabling, streaming, disabling, or releasing, and
   the audio stream session-related state is determined in relation to an audio processing condition.

5. The method of claim 1, wherein:
   the source device and the sink device include a Bluetooth Low Energy (BLE) protocol stack.

6. A source device for changing an audio stream session-related state, the s comprising:
   a transceiver configured to perform signal transmission and reception with a sink device; and
   a processor configured to control the transceiver and the source device;
   wherein the processor is configured to:
      receive, by a server in the source device from a client in the sink device, an initiating message based on a current audio stream session-related state of the client in the sink device before the server in the source device in a first audio stream session-related state performs an audio stream session-related state transition;
      determine, by the server in the source device, a second audio stream session-related state of the server in the source device based on the initiating message, without stopping an operation in the first audio stream session-related state; and
      cause the server in the source device to perform the audio stream session-related state transition based on the second audio stream session-related state,
   wherein an audio stream session-related state is maintained by the server in the source device and is shared with the client in the sink device using at least one characteristic.

7. The source device of claim 6, wherein:
   the audio stream session-related state transition of the server in the source device is initiated by the initiating message from the client in the sink device, and
   the initiating message is a write message for the at least one characteristic.

8. The source device of claim 7,
   the second audio stream session-related state is determined based at least on one of the first audio stream session-related state of the server in the source device, information included in the initiating message, or an audio processing condition of the server in the device.

9. The source device of claim 6,
the audio stream session-related state includes at least one of idle, codec configured, quality of service (QoS) configured, enabling, streaming, disabling, or releasing, and
the audio stream session-related state is determined in relation to an audio processing condition.

10. The source device of claim 6,
the source device and the sink device include a Bluetooth Low Energy (BLE) protocol stack.

* * * * *